US012243364B2

(12) United States Patent
Karjalainen

(10) Patent No.: US 12,243,364 B2
(45) Date of Patent: Mar. 4, 2025

(54) METHOD AND MEANS FOR VIRTUAL PROPERTY KEYS

(71) Applicant: iLOQ Oy, Oulu (FI)

(72) Inventor: Tomi Karjalainen, Oulu (FI)

(73) Assignee: ILOQ OY, Oulu (FI)

( * ) Notice: Subject to any disclaimer, the term of this patent is extended or adjusted under 35 U.S.C. 154(b) by 0 days.

(21) Appl. No.: 18/508,469

(22) Filed: Nov. 14, 2023

(65) Prior Publication Data

US 2024/0371218 A1 Nov. 7, 2024

Related U.S. Application Data

(60) Provisional application No. 63/499,622, filed on May 2, 2023.

(51) Int. Cl.
*G07C 9/00* (2020.01)

(52) U.S. Cl.
CPC .................... *G07C 9/00182* (2013.01); *G07C 2009/00277* (2013.01)

(58) Field of Classification Search
CPC .................. G07C 9/00182; G07C 2009/00277
See application file for complete search history.

(56) References Cited

U.S. PATENT DOCUMENTS

| | | | | |
|---|---|---|---|---|
| 11,421,445 | B2 | 8/2022 | Johnson et al. | |
| 11,468,723 | B1 | 10/2022 | Carter | |
| 2014/0266573 | A1* | 9/2014 | Sullivan | G07C 9/00571 340/4.32 |
| 2015/0287318 | A1* | 10/2015 | Nair | G06Q 10/10 340/5.6 |
| 2018/0005143 | A1* | 1/2018 | Camargo | H04W 12/06 |
| 2020/0327758 | A1* | 10/2020 | Ma | G07C 9/00571 |
| 2021/0134096 | A1* | 5/2021 | Pukari | G06F 21/35 |
| 2021/0407023 | A1* | 12/2021 | Brophy | G07C 9/215 |
| 2022/0406113 | A1 | 12/2022 | Imanuel | |

FOREIGN PATENT DOCUMENTS

WO 2014150649 A1 9/2014

OTHER PUBLICATIONS

Finnish Patent and Registration Office, International Search and Written Opinion for PCT Application No. PCT/FI2024/050157, dated Aug. 6, 2024.

* cited by examiner

*Primary Examiner* — Nabil H Syed
(74) *Attorney, Agent, or Firm* — Patterson + Sheridan, LLP

(57) ABSTRACT

Door lock systems are disclosed. More particularly, virtual keys in door lock systems of properties such as houses and apartments, and public properties such as parking garages, or sports facilities, are disclosed. This includes managing virtual key based access of temporary users, to a property or a vehicle sealed by a self-powered lock, from the mobile phone of a permanent user. This is achieved by virtual configurable software keys which are operable with a mobile application, and configurable from the mobile application of the permanent user. These virtual configurable software keys are typically text strings with a data footprint sufficiently small to be transmitted over NFC.

23 Claims, 22 Drawing Sheets

30

60

90

90

93

93

METHOD AND MEANS FOR VIRTUAL PROPERTY KEYS

CROSS-REFERENCE TO RELATED APPLICATIONS

This Application claims the benefit of and priority to U.S. Provisional Patent Application No. 63/499,622, filed on May 2, 2023, the entire contents of which are incorporated herein by reference.

TECHNICAL FIELD OF INVENTION

The invention relates to door lock systems. More particularly, aspects of the invention relate to virtual keys in door lock systems of properties such as houses and apartments, and public properties such as parking garages, or sports facilities.

BACKGROUND

The physical metal door key is the prevalent current choice in the free markets. However, a software based virtual key can be designed in more consumer friendly and environmentally friendly fashion to result in a superior end product.

U.S. Pat. No. 11,468,723 discloses a software virtual key based on a photograph, which can be read using artificial intelligence. More complex virtual keys and key reading processes increase authentication alternatives, and have the disadvantage of consuming more data and power.

U.S. Pat. No. 11,421,445 discloses a lock operable with NFC.

More complex software-based property access systems tend to derive savings from lesser use of physical keys. However, the locking systems themselves that operate without physical keys tend to be expensive, difficult to install, and still expensive to operate to the property.

Aspects of this invention will now alleviate these disadvantages.

SUMMARY

Aspects of the invention under study are directed towards a system and a method for managing virtual key based access of temporary users, to a property or a vehicle sealed by a self-powered lock, from the mobile phone of a permanent user.

This is achieved by virtual configurable software keys which are operable with a mobile application, and configurable from the mobile application of the permanent user. These virtual configurable software keys are typically text strings with a data footprint sufficiently small to be transmitted over NFC.

A further object of aspects of the invention is to present a configurable restricted key, which allows the permanent user to provide access to temporary users, but only to a restricted part of the property or vehicle, and/or for a restricted time.

One aspect of the invention also allows the permanent user and the temporary user to communicate virtual keys via a cloud network, for example from app to app, and/or from inbox to inbox, or from inbox to an app and vice versa. In one aspect of the invention the lock is a self-powered lock deriving its operating power from the insertion of the virtual key via an NFC connection.

Another aspect of the invention involves the mobile application that contains the configurable virtual key also being connected to domestic appliances other than the lock or the key, such as the dish washer or laundry washer, or air conditioning device. Additionally, this mobile application may also be connected to a database storing information of the property unit and domestic appliances in the property unit, such as operating instructions of the dish washer, or the like.

According to one aspect of the invention, the invention generates data output or actionable data linking domestic appliance data with lock and key related access data in the property unit. For example, if the virtual key indicates a potential entry time, when the key could be used the invention can be used to start e.g., the air conditioning in the property so that the property is cooled when the temporary user arrives, but no energy is wasted in cooling the property when nobody is in the property, or expected to be shortly in the property.

Some or all of the aforementioned advantages of the invention are accrued with a system for locking and unlocking at least one door to a property unit or a vehicle in accordance with the invention, which comprises a cloud server, a mobile device used by a user and a communication network, and,

- the mobile device has a mobile application connected to the cloud server configured to store a virtual key for facilitating the locking or unlocking of a door, and,
- the virtual key is configured to be sent to, and optionally received from, a second mobile application also connected to the cloud server,
- a permanent user of the property unit or vehicle may configure a restricted virtual key in the mobile application,
- the restricted virtual key will only open a restricted set of doors from all doors in the property unit or vehicle, and/or will only open one or more door for a restricted period of time,
- the permanent user may send the restricted virtual key to another user via a communication network, and the lock is a self-powered lock deriving its operating power from the insertion of the virtual key via an NFC connection.

A software program product stored in a non-transient memory medium for locking and unlocking at least one door to a property unit or a vehicle is in accordance with the invention and operable in a system comprising a cloud server, a mobile device used by a user and a communication network, and,

- the mobile device has a mobile application connected to the cloud server configured to store a virtual key for facilitating the locking or unlocking of a door with a lock, and,
- the virtual key is configured to be sent to and received from a second mobile application also connected to the cloud server,
- a permanent user of the property unit or vehicle may configure a restricted virtual key in the mobile application,
- the restricted virtual key will only open a restricted set of doors from all doors in the property unit or vehicle, and/or will only open one or more doors for a restricted period of time,
- the permanent user may send the restricted virtual key to another user via a communication network, and the lock is a self-powered lock deriving its operating power from the insertion of the virtual key via an NFC connection.

A system for locking and unlocking at least one door to a property unit is in accordance with the invention and comprises a cloud server, a mobile device used by a user, and a communication network, and, the mobile device has a mobile application connected to the cloud server configured to store a virtual key for facilitating the locking or unlocking of a door with a lock, and, the virtual key is configured to be sent to and received from a second mobile application also connected to the cloud server, a permanent user of the property unit or vehicle may configure a virtual key in the mobile application, the virtual key will open at least one door lock in the property unit, the mobile application is connected to a domestic appliance other than the lock or the key, the mobile application is connected to a database storing information of the property unit and domestic appliances in the property unit, and, the system is configured to generate data output or actionable data linking domestic appliance data with lock and key related access data in the property unit.

A software program product stored in a non-transient memory medium for locking and unlocking at least one door to a property unit is in accordance with the invention and operable in a system comprising a cloud server, a mobile device used by a user, and a communication network, and, the mobile device has a mobile application connected to the cloud server configured to store a virtual key for facilitating the locking or unlocking of a door with a lock, and, the virtual key is configured to be sent to and received from a second mobile application also connected to the cloud server, a permanent user of the property unit or vehicle may configure a virtual key in the mobile application, the virtual key will open at least one door lock in the property unit, the mobile application is connected to a domestic appliance other than the lock or the key, the mobile application is connected to a database storing information of the property unit and domestic appliances in the property unit, and, the system is configured to generate data output or actionable data linking domestic appliance data with lock and key related access data in the property unit.

Aspects of the invention have many advantages. As the virtual key can be configured with restrictions in the permanent user's app, there is minimal administrative cost related to generating and tracking keys. As the configured virtual key can be messaged within the cloud network between users, the logistics of delivering the temporary key becomes very easy. As the configuration of the virtual key is software based, the key can be restricted to any configuration of locks in the property. As the self-powered lock derives its power from the NFC conveying the virtual key, the locks do not need to be connected to grid power or other power sources. Further, as the mobile application with the virtual key is also connected to domestic appliances, a valid virtual key holder may be offered operating instructions of domestic appliances as he needs to use the appliances, or the appliances can be operated on behalf of the virtual key holder, for example by closing selected appliances when he leaves the property, or starting selected appliances when he enters the property.

In addition, and with reference to the aforementioned advantage accruing embodiments, the best mode of the invention is considered to be a system where self-powered locks are operated in a property with an NFC compliant mobile device. The mobile device has an app installed with which the user can open and close the locks by communicating a virtual software key via NFC to the lock that needs to be opened or closed. A permanent user can configure a virtual restricted key to a temporary user, and message the virtual restricted key via in-app messaging or other conventional route of messaging, such as email, to the temporary user who uses the virtual key to enter and use the property within the boundaries of the restrictions set by the permanent user. The best mode further links the virtual restricted key, which is a small data footprint text string type of key, to domestic appliances. For example, allowing and guiding the temporary user on how to use the dishwasher, but restricting the user from using for example the heater or cleaning device of the swimming pool, as this might be required to be operated by a professional.

BRIEF DESCRIPTION OF THE DRAWINGS

In the following the invention will be described in greater detail with reference to exemplary embodiments in accordance with the accompanying drawings, in which FIG. 1 demonstrates an embodiment 10 of the inventive system for locking and unlocking at least one door to a property unit or a vehicle as a block diagram.

Some of the embodiments are described in the dependent claims.

DETAILED DESCRIPTION OF EMBODIMENTS

Figure 1:
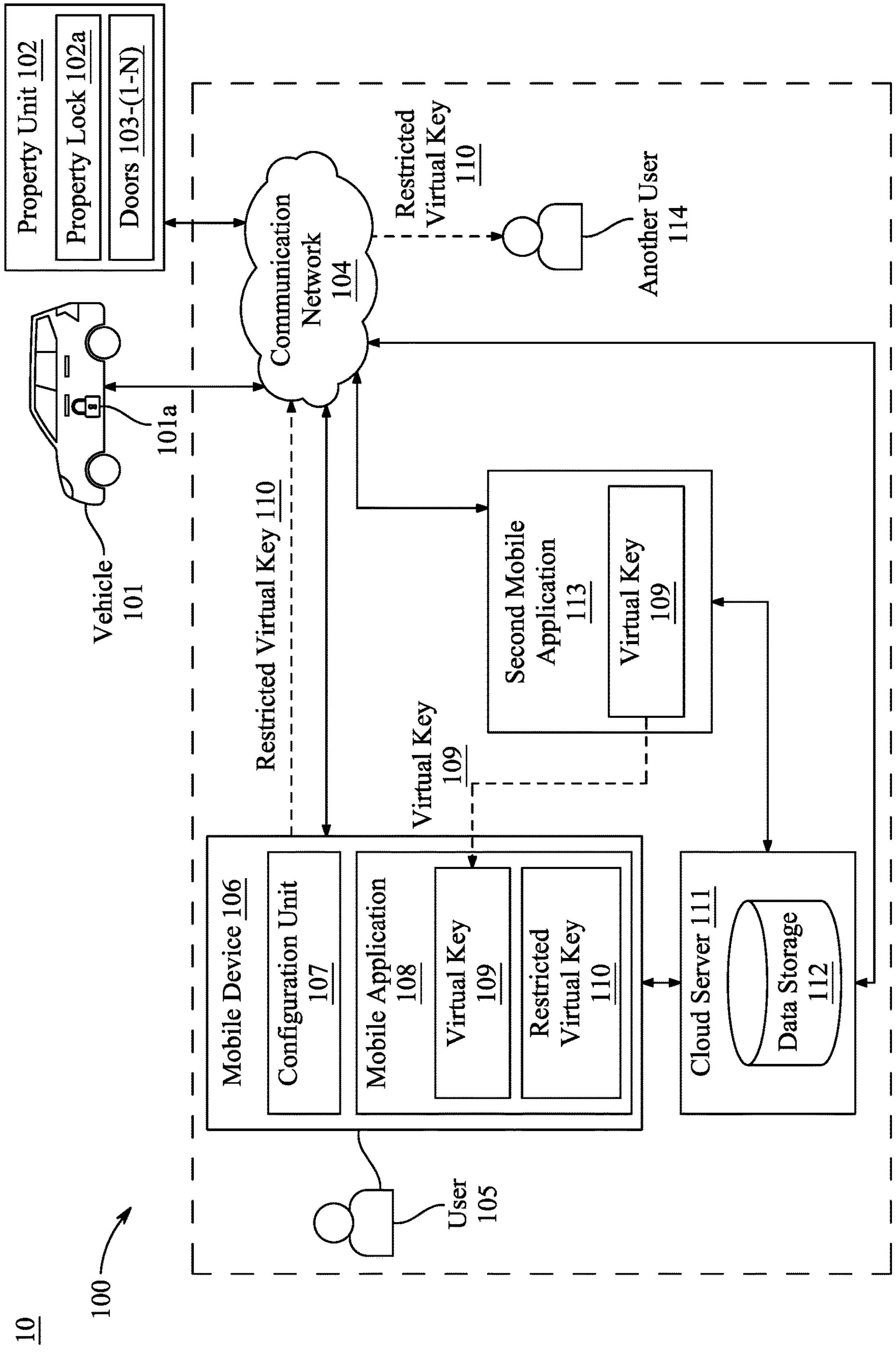

FIG. 1 demonstrates an embodiment 10 with a mobile application 108 for handling virtual keys. The cloud based mobile application 108 may be available over Google Play™ store for downloading over Android smartphones, over App Store™ for downloading over iOS™ smartphones and/or over any other known application stores. The cloud based mobile application 108 may either be available for free or as a paid application.

In embodiment 10, the system 100 is integrated with a cloud server 111, via a communication network 104. The cloud server 111 may comprise a CPU (Central Processing Unit) and/or GPU (Graphical Processing Unit) or multiple CPUs and/or GPUs. The communication network 104 used for the communication in aspects of the invention is the wireless or wireline Internet or the telephony network, which is typically a cellular network such as UMTS-(Universal Mobile Telecommunication System), GSM-(Global System for Mobile Telecommunications), GPRS-(General Packet Radio Service), CDMA-(Code Division Multiple Access), 3G-, 4G-, 5G-, Wi-Fi and/or WCDMA (Wideband Code Division Multiple Access) network.

In an example, the cloud server 111 may comprise a plurality of servers (not shown). In an example implementation, the cloud server 111 may be any type of a database server, a file server, a web server, an application server, etc., configured to store data related to the cloud based locking system 100. The cloud server 111 may also comprise a plurality of databases for storing data files. The databases may be, for example, a structured query language (SQL) database, a NoSQL database such as the Microsoft® SQL Server, the Oracle® servers, the MySQL® database, etc. The cloud server 111 may be deployed in a cloud environment managed by a cloud storage service provider, and the databases may be configured as cloud-based databases implemented in the cloud environment.

The cloud server 111 may include an input-output device such as a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realize the cloud network used by the cloud server 111 of aspects of the invention. The cloud server 111 can be purchased as a separate solution from known vendors such as Microsoft, Amazon and/or HP (Hewlett-Packard). The cloud server 111 typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly or partly, on SSD i.e., Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage, or the like. Using Flash as the backbone storage for the cloud server 222 is preferred despite its high cost due to the reduced latency it provides.

The system 100 comprises a mobile device 106, typically a smartphone and/or a tablet or the like that is used to manage the virtual keys of the user using operating software applications installed on the smartphone, etc. The mobile device 106 is typically a mobile smartphone, such as iOS, Android, FireOS, a Windows Phone smartphone or any other mobile smartphone capable of executing applications. There is a CPU or a GPU present in the smartphone.

However, it is also possible that the mobile device 106 is a computer, such as a PC-computer, Apple Macintosh-computer, PDA-device (Personal Digital Assistant). The mobile device 106 could further be a device having an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

Embodiments 10, 20 and 30 describe essentially the same embodiment, the differentiator being that embodiment 10 describes how aspects of the invention work as a system, embodiment 20 how aspects of the invention work as software, and embodiment 30 describes the use method and user experience of the system 10 and software 20.

In aspects of the invention, the mobile device 106 has a mobile application 108 connected to the cloud server 111. The mobile application 108 and the cloud server are configured to store at least one virtual software key 109 for facilitating the locking or unlocking of a door 103. The system can also generate virtual keys 109, and virtual keys may be generated with the mobile application 108 upon the instructions of the owner/tenant of the property unit 102 or vehicle 101, who is typically a user 105, characterized as an admin user or permanent user in the system 100. In a way, the tenant/owner can now take independent control of the lock-keys administration process, and produce new virtual keys for opening and locking the door lock, without having to ask a locksmith company to produce new metal keys, as people have done in the past in accordance with the prior art.

The generated virtual key 109 is configured to be sent to and/or optionally received from a second mobile application 113, used by another user 114, also connected to the cloud server 111. Typically, the user 105 might be e.g., a parent and another user 114 might be a child living in the same property 102. Or family members such as parents and children could all be configured as permanent users 105, and friends and relatives who come to visit could be configured as other users 114 in some embodiments. Analogously, property owners and/or landlords would typically be configured as permanent users, and renting residents and tenants would typically be provided with a restricted virtual key. In some embodiments the restricted virtual key may be configured to auto-renew monthly upon timely receipt of the rental payment, for example. The transmission of the virtual key takes place as an electronic data transmission over the cloud network 104. Therefore, a physical handover of a metal key between user 105 and another user 114 is no longer required. In some embodiments restricted virtual keys may be allowed to be sent between temporary other users 114. For example, another user 114 could send a copy of the restricted virtual key to another person granting him access to some doors or locks, for example conditionally based on authentication.

The permanent user 105 of the property unit 102 or vehicle 101 may configure a restricted virtual key in the mobile application 108, which restricted virtual key 110 is then sent to the second mobile application. The restricted virtual key may for example only open a restricted set of doors from all doors in the property unit 102 or vehicle 101, for example thereby preventing a child user 114 from accessing a room with dangerous machinery or firearms, or the driver seat in the vehicle 101.

Alternatively, or additionally, the restricted virtual key may only open one or more doors for a restricted period of time. If another user 114 is, for example an Airbnb guest, the tenant/owner user 105 may restrict the operation time of the restricted key to match the duration of the stay of the Airbnb guest.

The permanent user 105 may send the restricted virtual key 109 to another user 114 via a communication network 104, and in preferable embodiments the lock 102*a*, 101*a* is a self-powered lock deriving its operating power from the insertion of the virtual key 109 or restricted virtual key 110 via an NFC connection. The virtual key is typically a string of alphanumeric data that is configured to open the lock, and optionally authenticate the user 105, 114. The restrictions of the virtual key, making up the restricted virtual key, are also preferably encoded into the text string making up the virtual key in some embodiments. When the virtual key or restricted virtual key is submitted from the mobile device 106 via NFC (Near Field Communication) to the lock 102*a* in the door, a small amount of power in addition to the virtual key or restricted virtual key is transmitted wirelessly via NFC to the lock, the transmitted power nevertheless being sufficient to open or close the lock 102*a* of the door. Usually in some embodiments, however, the vehicle lock would derive power from the power systems of the vehicle.

Any features of embodiment 10 may be readily combined or permuted with any of the other embodiments 10, 20, 30, 40, 50, 60, 70, 80, 90, 91, 92 and/or 93 in accordance with the invention.

Figure 2:
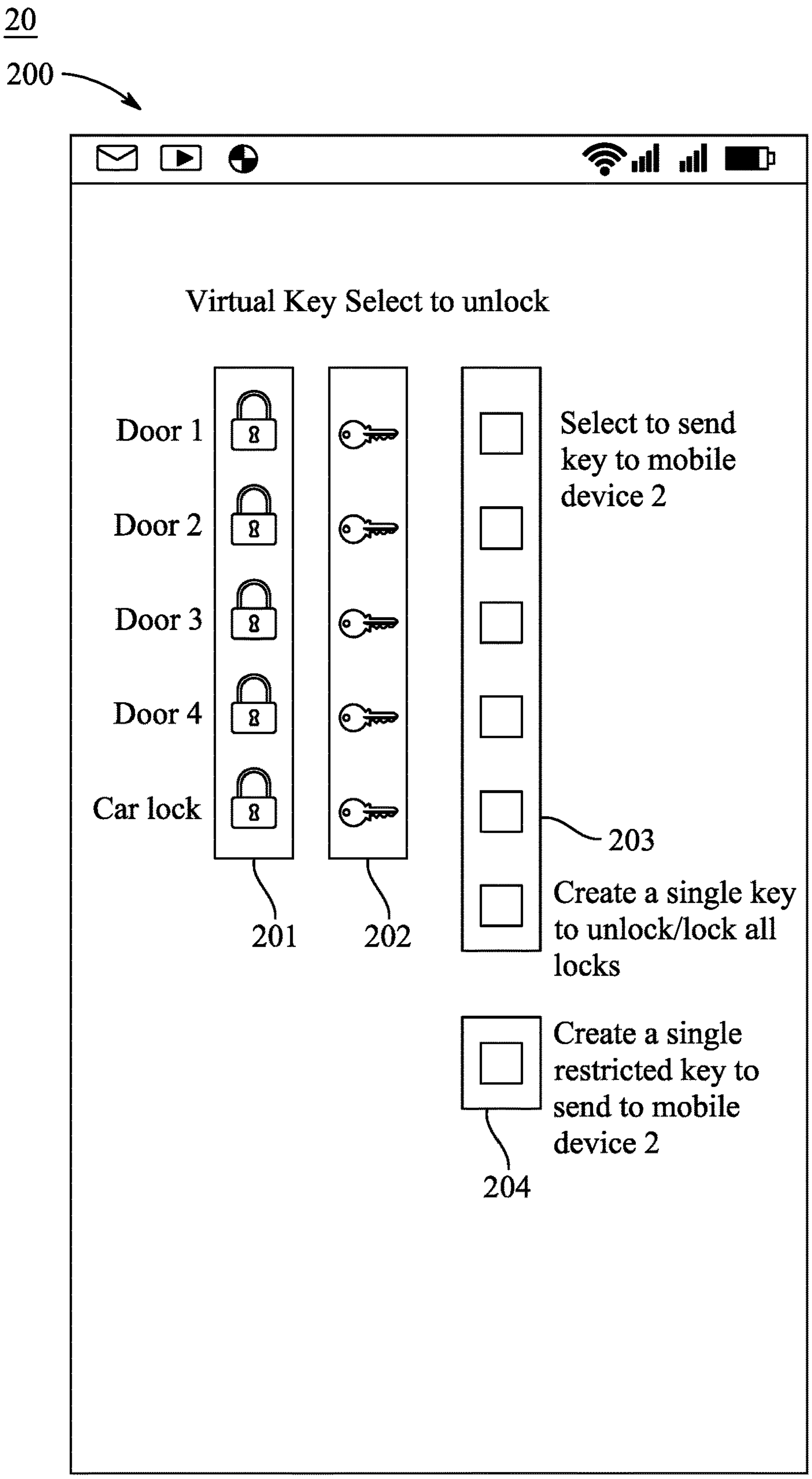
FIG. 2 demonstrates an embodiment 20 of the inventive user interface diagram of an inventive software program product for locking and unlocking at least one door to a property unit or a vehicle.

FIG. 2 demonstrates an embodiment 20 of the software interface in the mobile application 108. The mobile application 108 is a software program product stored in a non-transient memory medium for locking and unlocking at least one door to a property unit 102 or a vehicle 101, operable in a system comprising a cloud server 111, and a mobile device 106 used by a user 105, 114 and a communication network 104.

The mobile device 106 has a mobile application 108 connected to the cloud server 111 configured to store a virtual key 109 for facilitating the locking or unlocking of a door with a lock. In embodiment 20, the toggle 201 defines and lists the doors and the locks in the property 102 or vehicle 101. The toggle 202 defines the corresponding keys, providing access to each door and lock in toggle 201. By selecting the key for Door 1 from Toggle 203, but not the other keys or doors, the permanent user may configure a restricted virtual key 110 capable of opening the lock in Door 1, but not the other locks. By selecting toggle 204 the virtual key is configured to be sent to a second mobile application 113 also connected to the cloud server 111. This view is from the mobile application 108 of the permanent user 105 of the property unit 102 or vehicle 101, who has the user privileges to configure a restricted virtual key in the mobile application. Another user 114 does not have these privileges. He may only receive a virtual key 109, 110 and use it, but he may not configure restrictions into the virtual key 109, 110.

The restricted virtual key 110 will only open a restricted set of doors from all doors in the property unit 102 or vehicle 101, for example the Door 1 only as just discussed. It is also possible in some embodiments of the invention, that the restricted virtual key 110 will only open one or more doors for a restricted period of time. In these embodiments, the restricted period of time is configured into the restricted virtual key 110 with toggles similar to 201, 202, 203, or by keyboard entry, or some other form of data entry.

Once the restricted key has been configured, the permanent user 105 may send the restricted virtual key 110 to another user 114 via a communication network 111. Another user 114 may then receive the restricted virtual key 110 in his mobile application 113 (second mobile application) and open the lock of Door 1. This lock is typically a self-powered lock deriving its operating power from the insertion of the restricted virtual key 110 via an NFC connection.

Any features of embodiment 20 may be readily combined or permuted with any of the other embodiments 10, 30, 40, 50, 60, 70, 80, 90, 91, 92 and/or 93 in accordance with the invention.

Figure 3:
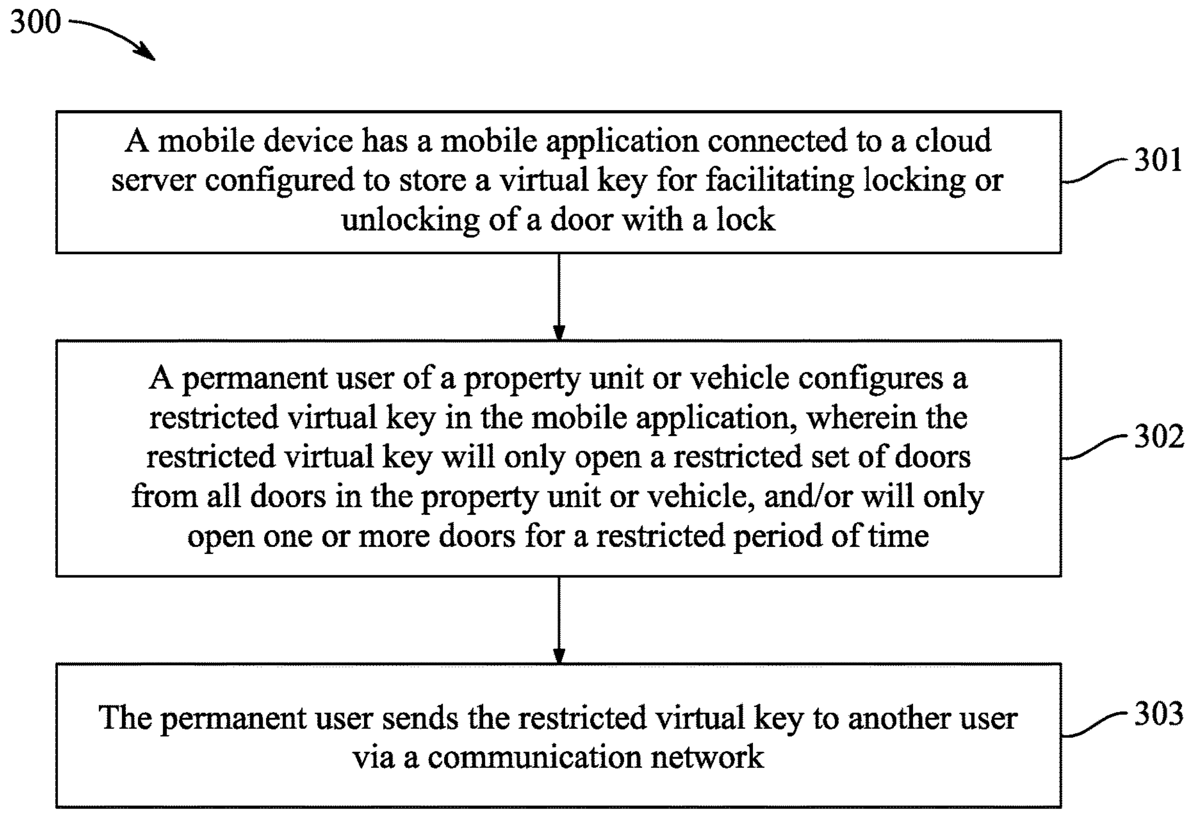
FIG. 3 demonstrates an embodiment 30 of the inventive method of the permanent user operating the system 10 or software 20 as a flow chart in accordance with the invention.

FIG. 3 demonstrates an embodiment 30 illustrating the use of the system 100 and software 200 of embodiments 10 and 20 respectively, as a flow diagram. The method 30 uses a software program product 200 stored in a non-transient memory medium for locking and unlocking at least one door to a property unit 102 or a vehicle 101, operable in a system 100 comprising a cloud server 111, a mobile device 106 used by a permanent user 105 and a communication network 104.

In phase 301, the mobile device 108 has a mobile application 106 connected to the cloud server 111 configured to store a virtual key for facilitating the locking or unlocking of a door with a lock. The virtual key is configured to be sent to, and optionally received from, a second mobile application 113 also connected to the cloud server 111.

In phase 302 the permanent user 105 of the property unit 102 or vehicle 101 configures a restricted virtual key 110 in the mobile application 106. The restricted virtual key 110 will only open a restricted set of doors from all doors in the property unit 102 or vehicle 101, and/or will only open one or more doors for a restricted period of time. The permanent user 105 uses e.g., the software user interface shown in FIG. 2 to configure the restricted virtual key 110. The configuration choices that amount to the restrictions are typically encoded into an alphanumeric data or binary data string, which in some embodiments is wholly or partially inserted into the virtual key 109, thereby forming a restricted virtual key 110. A binary or alphanumeric string form is preferable in some embodiments of the invention, because the amount of data transferred is small, which will lead to a small operational power consumption in the lock during reading of the virtual key and the subsequent opening or closing of the lock, in the event that the virtual key is authorized to open or close the lock.

In phase 303 the permanent user 105 sends the restricted virtual key 110 to another user 114 via a communication network 104. Preferably, the lock is a self-powered lock deriving its operating power from the insertion of the restricted virtual key 110 via an NFC connection. If the restricted virtual key 110 is authorized to open the lock, and all restricted parameters such as time are satisfied, the lock is opened. However, if the virtual key is not authorized to open the lock, or some restriction encoded into the restricted virtual key is violated at the time of the attempted opening of the lock, the lock remains closed.

Any features of embodiment 30 may be readily combined or permuted with any of the other embodiments 10, 20, 40, 50, 60, 70, 80, 90, 91, 92 and/or 93 in accordance with the invention.

Figure 4:
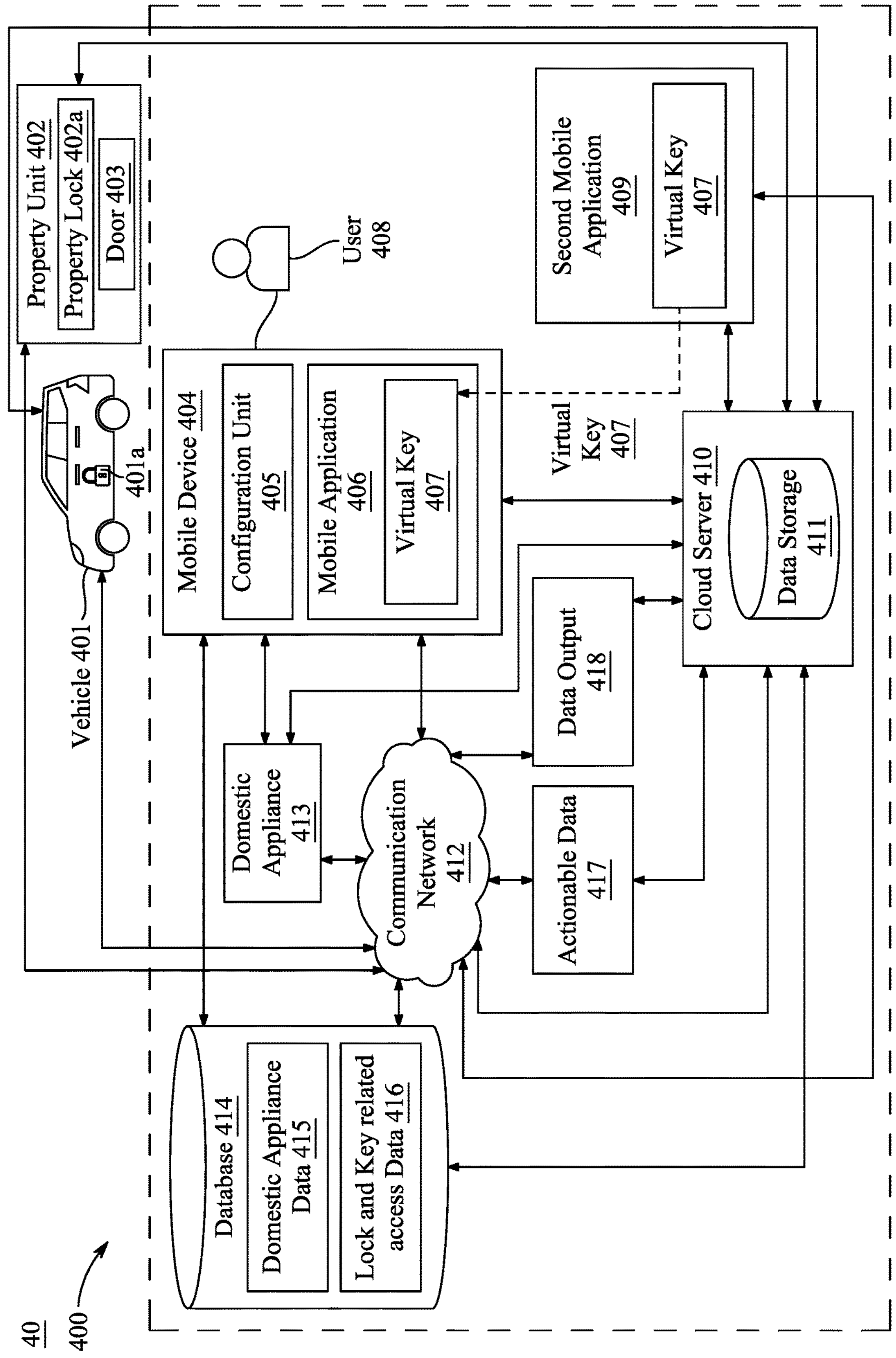
FIG. 4 demonstrates an embodiment 40 of the inventive system for locking and unlocking at least one door to a property unit or a vehicle, integrated with domestic appliances, as a block diagram.

FIG. 4 demonstrates an embodiment 40 that may be realised as a combined embodiment with the system 100 of embodiment 10. Embodiments 40, 50 and 60 describe essentially the same embodiment, the differentiator being that embodiment 40 describes how aspects of the invention work as a system, embodiment 50 how aspects of the invention work as software, and embodiment 60 describes the use method and user experience of the system 40 and software 50.

The system for locking and unlocking at least one door 403 to a property unit 402 or a vehicle 401, comprises a cloud server 410, a mobile device 404 used by a user 408, and a communication network 412. The mobile device 404 has a mobile application 406 connected to the cloud server 410. The mobile application 406 and/or the cloud server 410 are configured, either individually or together, to store a virtual key 407 for facilitating the locking or unlocking of a door 403 with a lock.

The virtual key 407 is configured to be sent to, and optionally received from, a second mobile application 409 also connected to the cloud server 410. A permanent user 105 or 408 of the property unit 402 or vehicle 401 may configure a virtual key 407 in the mobile application 406 similarly as explained with embodiments 10, 20 and 30. The virtual key 407 will open at least one door lock in the property unit 402 and/or vehicle 401.

Additionally, the mobile application 406 is connected to a domestic appliance 413 other than the lock or the key. This domestic appliance may include any of the following: dishwasher, refrigerator, laundry machine, vacuum cleaning drone, heater, air conditioning device, oven, swimming pool control devices, lighting, or the like. The mobile application 406 is connected to a database 414 storing information of the property unit 402 and at least one domestic appliance 413 in the property unit. The system 400 is configured to generate data output 418 or actionable data 417 linking domestic appliance data 415 with lock and key related access data 416 of the property unit 402.

This allows for example the user 408 to configure different room temperatures for different users with virtual keys in different rooms of the property 402 at different times.

Suppose the user 408 is a parent and the second mobile application 409 is used by a child who receives the virtual key 407. If the child prefers a cooler temperature than the parent, the use of the virtual key 407 by the child to enter the property 402, may be used to generate actionable data 417 to the air conditioning device or a heater to lower the temperature at a time when the child is known to be inside the property 402. If the virtual key is restricted, for example as restricted virtual key 110, then only the air conditioning in those rooms that are accessed by the restricted virtual key 110 is controlled with actionable data.

Embodiments 40, 50 and 60 describe essentially the same embodiment, the differentiator being that embodiment 40 describes how aspects of the invention work as a system, embodiment 50 how aspects of the invention work as software, and embodiment 60 describes the use method and user experience of the system 400 and software 500. Any features of embodiment 40 may be readily combined or permuted with any of the other embodiments 10, 20, 30, 50, 60, 70, 80, 90, 91, 92 and/or 93 in accordance with the invention.

Figure 5:
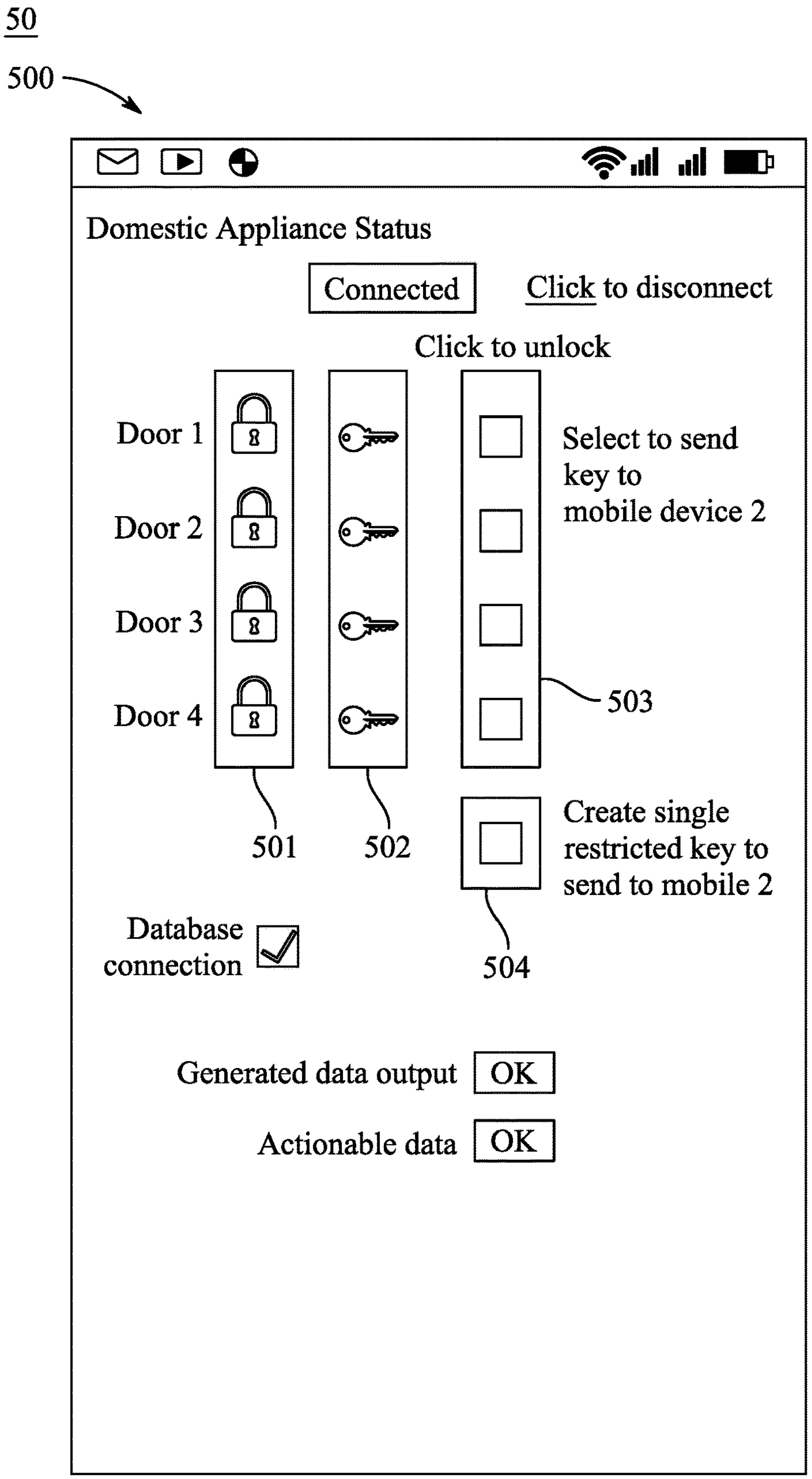
FIG. 5 demonstrates an embodiment 50 of the inventive user interface diagram of an inventive software program product for locking and unlocking at least one door to a property unit or a vehicle, integrated with domestic appliances.

FIG. 5 demonstrates an embodiment 50 of the software used to operate systems 100 and 400. The mobile device 404 has a mobile application 406 connected to the cloud server 410 configured to store a virtual key 407 for facilitating the locking or unlocking of a door 403 with a lock 402*a*. The virtual key 407 is configured to be sent to, and optionally received from, a second mobile application 409, also connected to the cloud server 410. The permanent user 408 of the property unit 402 or vehicle 401 may configure a virtual key 407 in the mobile application 406. As can be seen from FIG. 5, the mobile application 406 is connected to a domestic appliance 413 and can produce a virtual key that will open at least one door lock out of Doors 1, 2, 3, 4 in the property unit 402 by making the selections in Toggle 503.

The mobile application 406 is connected to a database 414 storing information of the property unit 403 and domestic appliances 413 in the property unit, as shown in the top of the screen. The system 400 is configured to generate data output 418 and/or actionable data 417 linking domestic appliance data 415 with lock and key related access data 416 in the property unit 402. The generated data output 418 may include, for example, user instruction commands for an air conditioning device in room 1, when room is selected from toggle 503. The user instruction commands are sent to the air conditioning device when the room 1 is accessed with the restricted virtual key 110 configured here, allowing access to Room 1. Actionable data 417 may include, for example, a temperature range desired for room 1 when accessed by the restricted virtual key 110 configured here. As shown in FIG. 5, both Generated data output 418 and Actionable data 417 are selected to be operational at the bottom of the screen.

Any features of embodiment 50 may be readily combined or permuted with any of the other embodiments 10, 20, 30, 40, 60, 70, 80, 90, 91, 92 and/or 93 in accordance with the invention.

Figure 6:
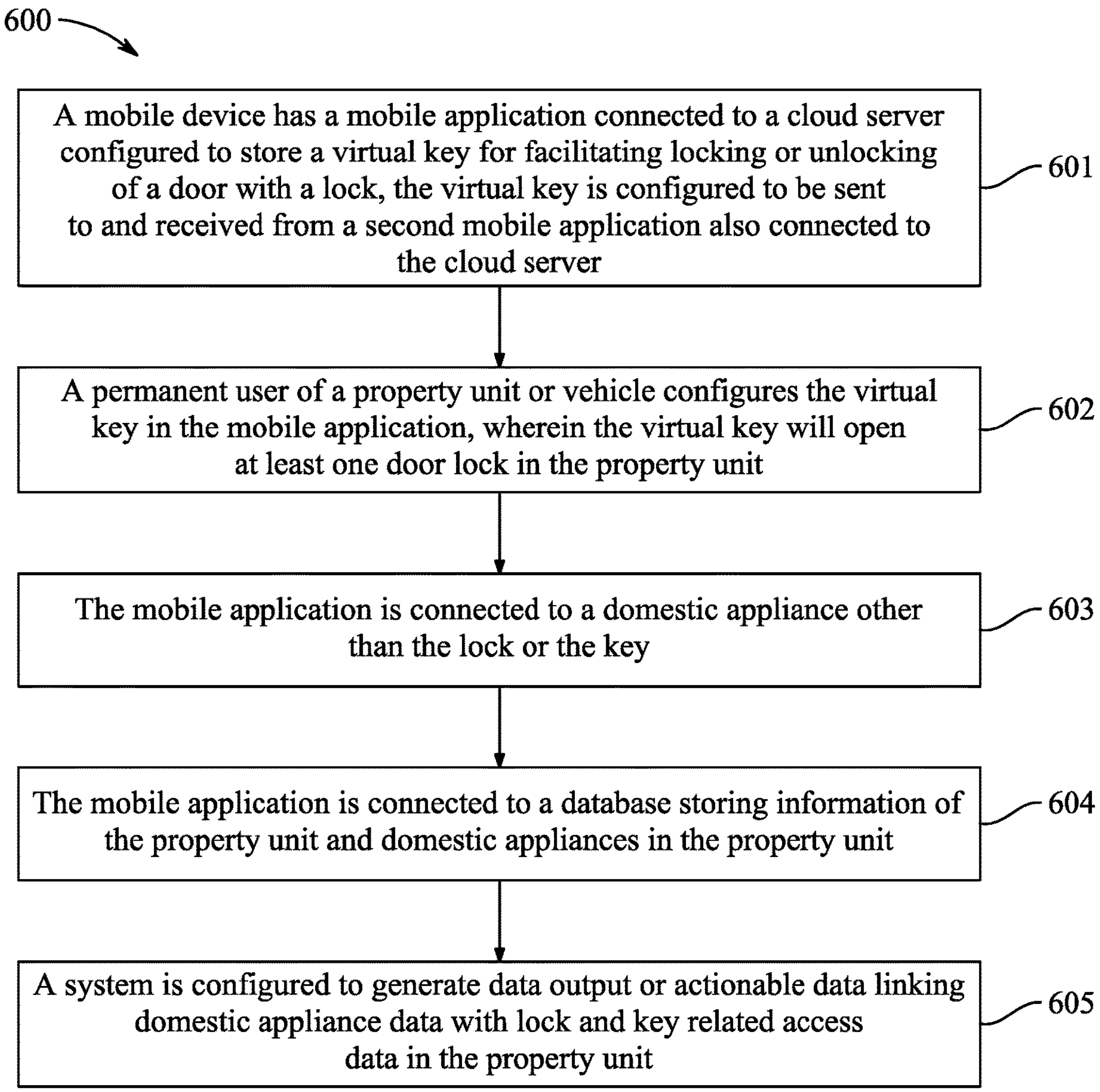
FIG. 6 demonstrates an embodiment 60 of the inventive method of the permanent user operating the system 40 or software 50 as a flow chart in accordance with the invention.

FIG. 6 demonstrates an embodiment 60 of using the system 400 and the software 500 as a flow chart.

In phase 601, the mobile device 404 has a mobile application 406 connected to the cloud server 410 configured to store a virtual key 407 for facilitating the locking or unlocking of a door 403 with a lock 402*a*, and the virtual key 407 is configured to be sent to, and optionally received from, a second mobile application 409 also connected to the cloud server 410.

In phase 602, a permanent user 408 of the property unit 402 or vehicle 401 configures a virtual key 407 in the mobile application 406. The virtual key will open at least one door lock 402*a*, for example a self-powered lock, or an NFC self-powered lock, in the property unit 402.

In phase 603, the mobile application 406 is connected to a domestic appliance 413 other than the lock or the key. This domestic appliance 413 could be for example a dishwasher, or air conditioning device in some embodiments.

In phase 604, the mobile application 406 is connected to a database 414 storing information of the property unit 402 and domestic appliances 413 in the property unit 402. For example, the database 414 may store the user manuals of the domestic appliances 413, such as the user manual for the air conditioning device or the user manual for the dishwasher.

In phase 605 the system 400 and software 500 generates data output 418 or actionable data 417 linking domestic appliance data 415 with lock and key related access data 416 in the property unit 402. For example, the virtual key 407 can be configured so that when the key is used to access the property unit 402, air-conditioning is turned on and the user manual of the dishwasher is shared in the second mobile application 409 to the second user, who now is in the air-conditioned property with instructions on how to use the dishwasher. When the virtual key 407 expires, actionable data 417 or computerized instructions could be automatically generated to remove the user manual from the second mobile application 409 in some embodiments.

Any features of embodiment 60 may be readily combined or permuted with any of the other embodiments 10, 20, 30, 40, 50, 70, 80, 90, 91, 92 and/or 93 in accordance with the invention.

Figure 7:
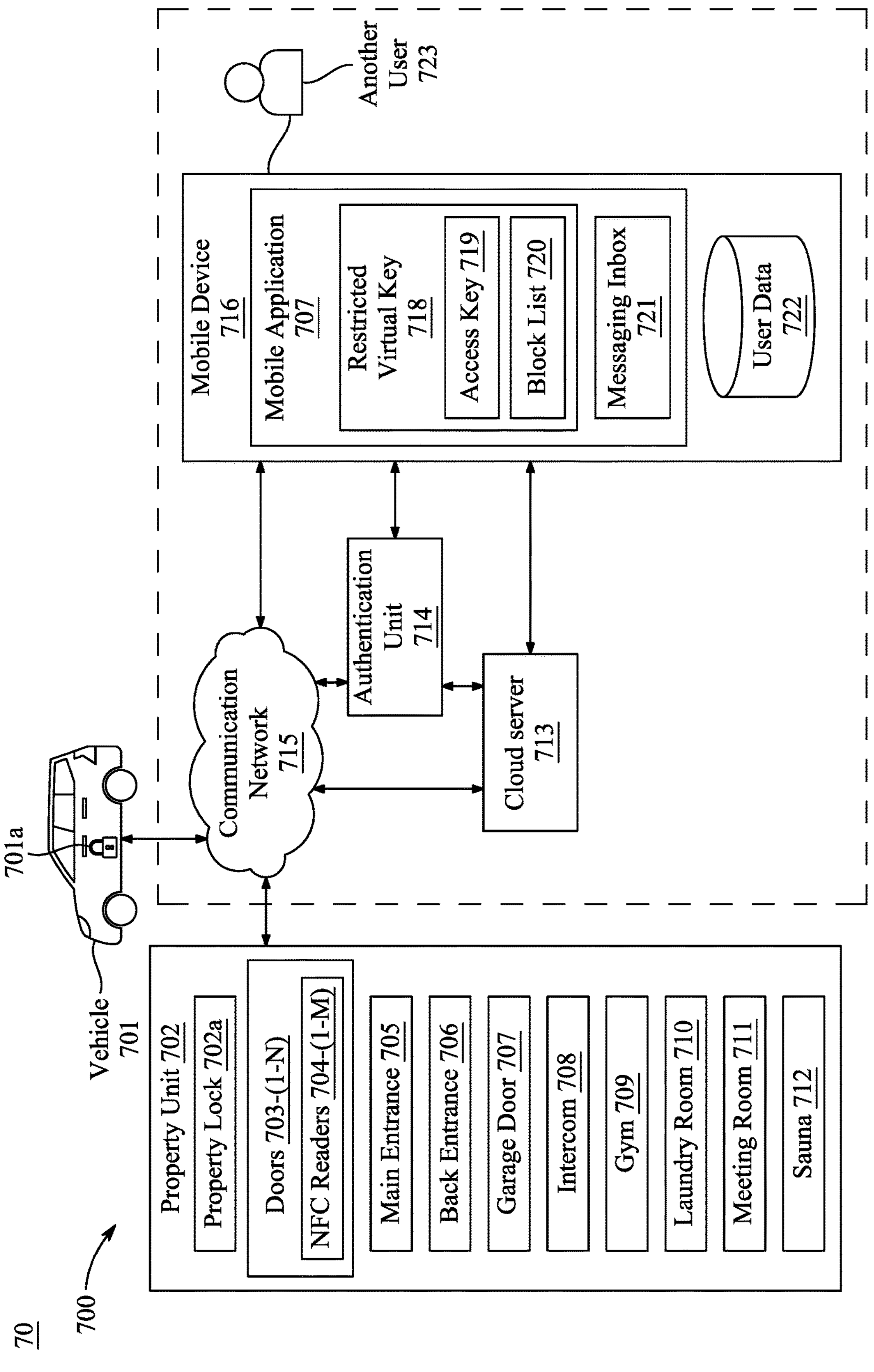
FIG. 7 demonstrates a more developed embodiment 70 of the inventive system for locking and unlocking at least one door to a property unit or a vehicle as a block diagram.

FIG. 7 demonstrates a more developed version 70 of embodiment 10. This system 700 is otherwise similar to system 100 but incorporates more advanced functions.

Another user 723 receives the restricted virtual key 718 into the mobile application 707 or a messaging inbox 721 on his mobile device 716. Another user 723 may open the restricted set of doors 705 during the restricted time at the property unit 702 or vehicle 701 using the restricted virtual key. Another user 723 is authenticated while opening a message, typically from the permanent user 105, with the restricted virtual key 718, and the restricted virtual key 718 only works if the authenticated person is the intended user of the restricted virtual key 718. The recipient of the restricted virtual key 718 is preferably authenticated based on his cloud service account details, banking credentials and/or biometrically, for example by using the biometric authentication, such as fingerprint or FaceID (a facial bone scan) on his smartphone, in some embodiments.

The mobile application 707 features toggles for controlling access to parts of the property unit 702, such as any of the following: main entrance 705, back entrance 706, garage door 707, intercom 708. Also, in some embodiments the mobile application 707 features toggles for reserving access to parts of the property unit 702, such as any of the following: Gym 709, Laundry room 710, Meeting Room 711, Sauna 712.

In some embodiments, the virtual restricted key 718 is a code that comprises an access key to the property unit 702 or vehicle 701, and a block list 720, listing blocked locations, and blocked times for locations. Typically, at least one door has an NFC reader 704 which is configured to read the restricted virtual key 718, and open the lock in the door if the restricted virtual key 718 grants access through the door at the current time.

Embodiments 70, 80 and 90 describe essentially the same embodiment, the differentiator being that embodiment 70 describes how aspects of the invention work as a system, embodiment 80 how aspects of the invention work as software, and embodiment 90 describes the use method and user experience of the system 700 and software 800.

Any features of embodiment 70 may be readily combined or permuted with any of the other embodiments 10, 20, 30, 40, 50, 60, 80, 90, 91, 92 and/or 93 in accordance with the invention.

Figure 8A:
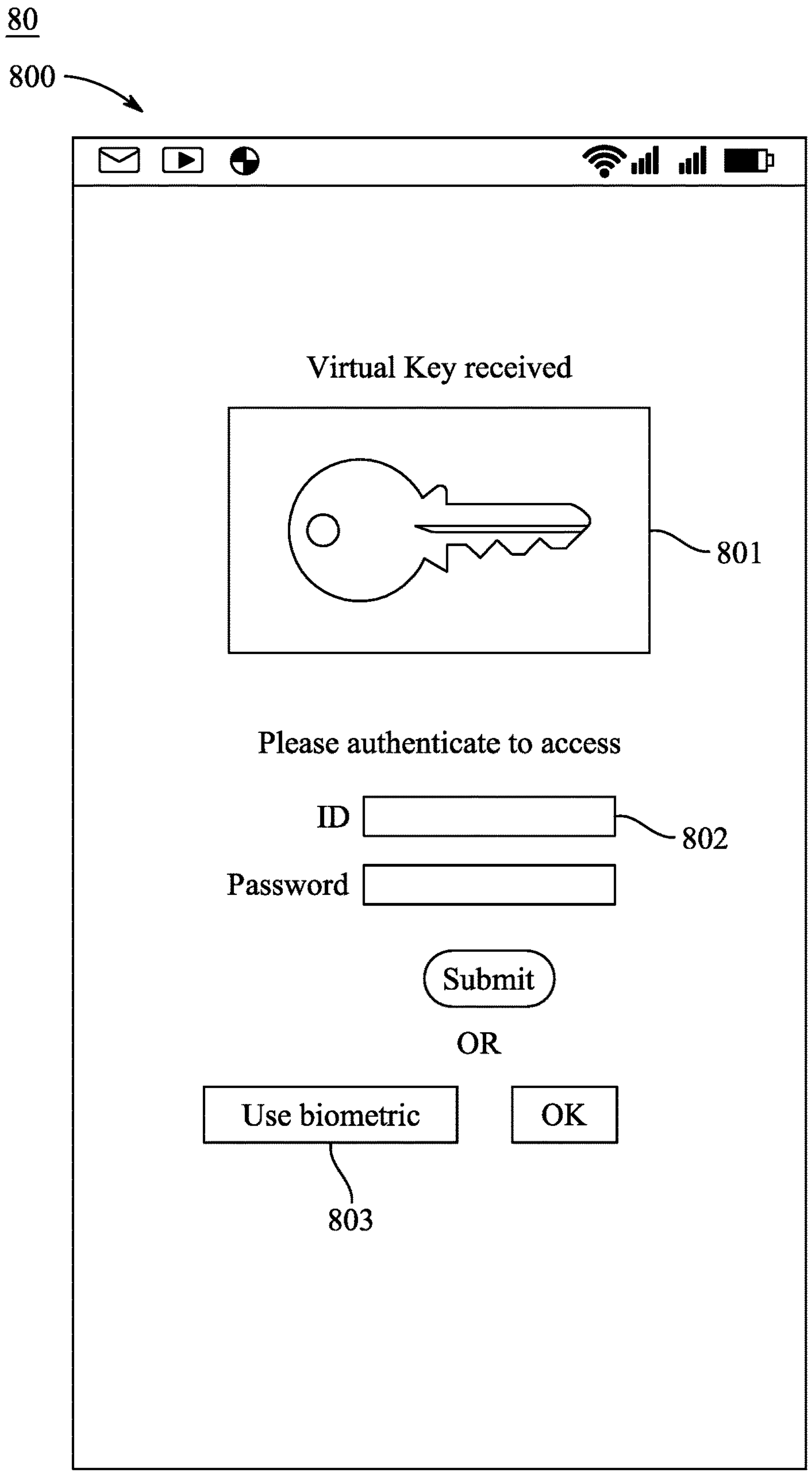
FIG. 8A-8C demonstrates a more developed embodiment 80 of the inventive user interface diagram of an inventive software program product for locking and unlocking at least one door to a property unit or a vehicle.
Figure 8B:
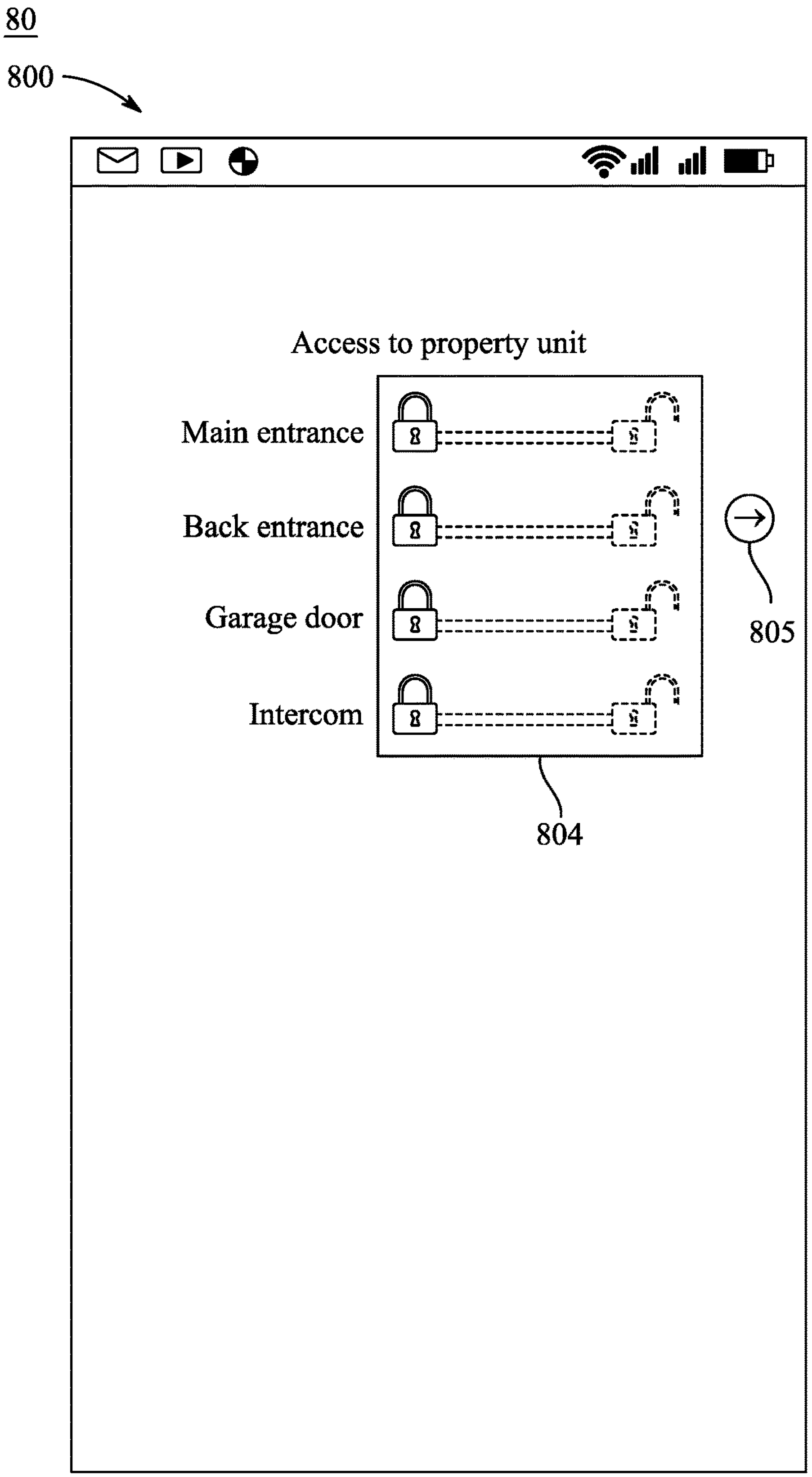
Figure 8C:
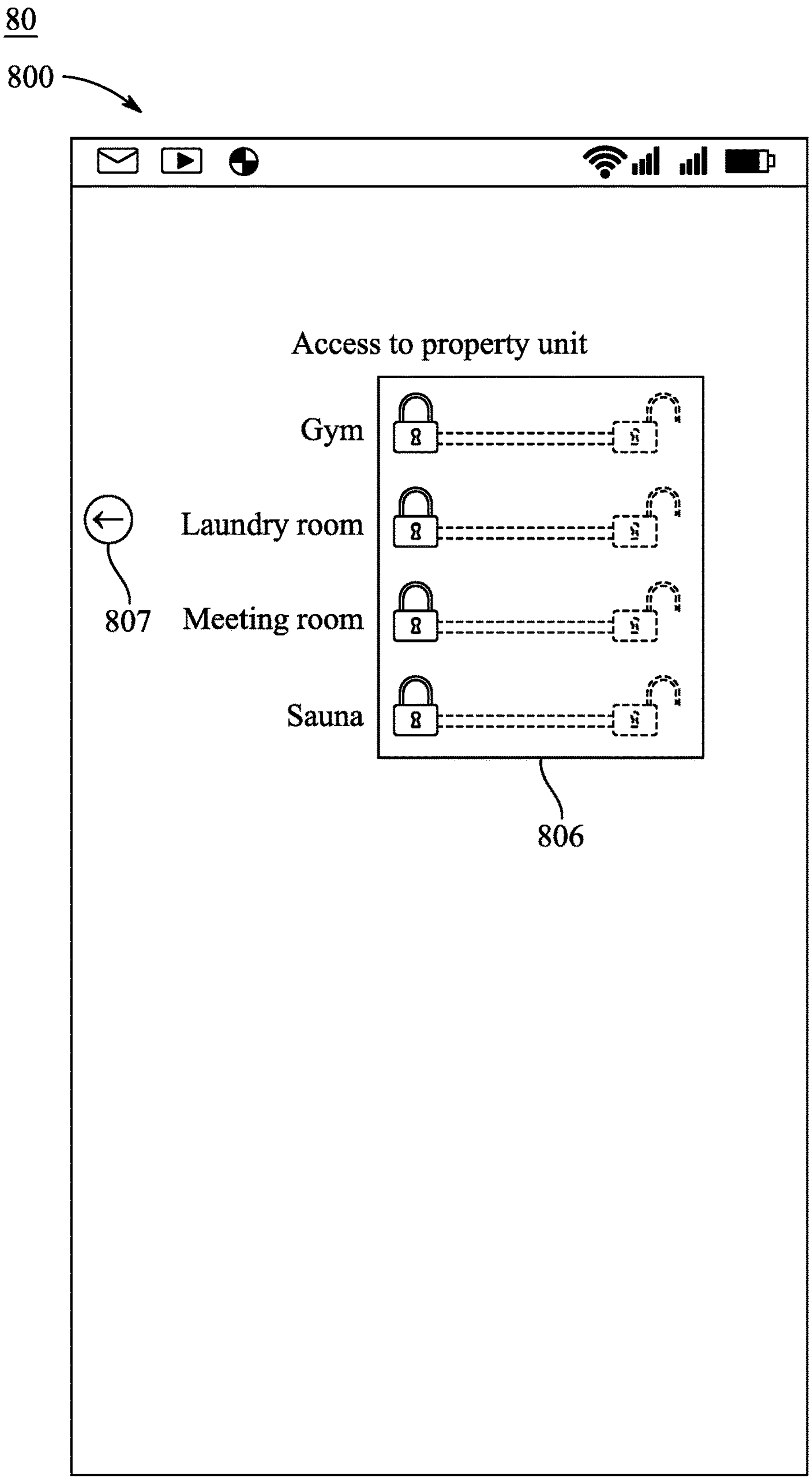

FIGS. 8A-8C demonstrate a more developed version 80 of embodiment 20. The software program product 800 is otherwise similar to software program product 200, but incorporates more advanced functions. Another user 723 receives the restricted virtual 718 key into a mobile application 800 or into a messaging inbox 721 on his mobile device 716, as shown by icon 801. The other user 723 may open the restricted set of doors 703 during the restricted time at the property unit 702 or vehicle 701 using the restricted virtual key 718.

Another user 723 is authenticated while opening the message with the restricted virtual key 718, and the restricted virtual key 718 only works, if the authenticated person is the intended user of the restricted virtual key 718. The other user 723 may be authenticated with a password and user ID 802 that are decrypted from the virtual key in some embodiments. Also, the recipient of the restricted virtual key may be authenticated based on his cloud service account details, such as iCloud, Google Cloud, or Microsoft credentials, or by banking credentials and/or biometrically 803, for example with a fingerprint or a facial scan FaceID.

As shown in FIG. 8B the mobile application features toggles 804 for controlling access to parts of the property unit, such as any of the following: main entrance, back entrance, garage door, intercom. As shown in FIG. 8C the mobile application 707 features toggles 806 for reserving access to parts of the property unit, such as any of the following: Gym, Laundry room, Meeting Room, Sauna in some embodiments.

The virtual restricted key is a code that typically comprises an alphanumeric or binary access key to the property unit 702 or vehicle 701, and a block list 720, listing blocked locations, and blocked times for locations. Typically, at least one door has an NFC reader 704, which is configured to read the restricted virtual key 718, and open the lock **702*a* in the door using power received from the smartphone via NFC, if the restricted virtual key grants access through the door at the current time. This allows to create a self-powered virtual key lock, where the lock 702*a*** in the door does not need a power source.

Any features of embodiment 80 may be readily combined or permuted with any of the other embodiments 10, 20, 30, 40, 50, 60, 70, 90, 91, 92 and/or 93 in accordance with the invention.

Figure 9A:
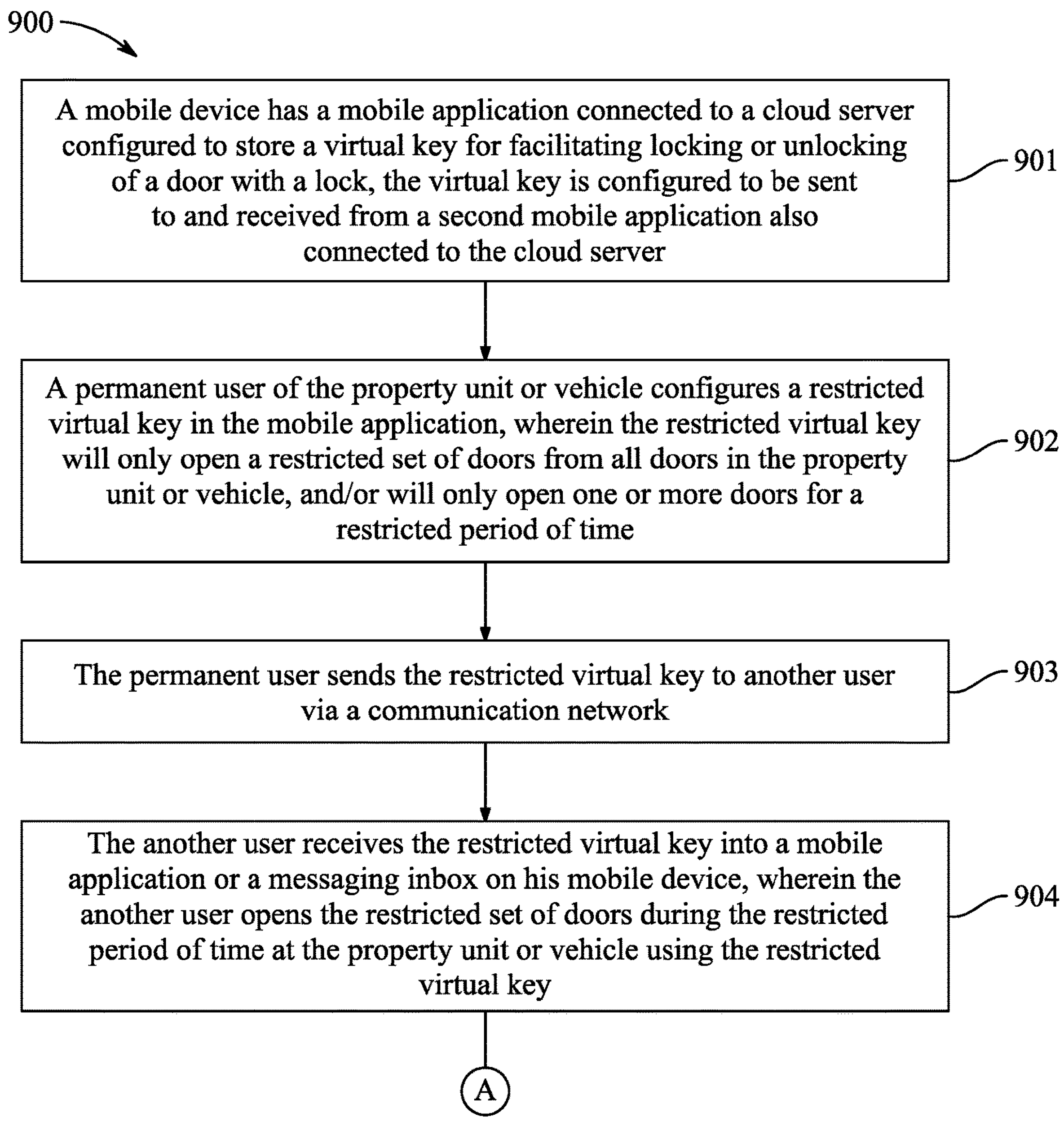
FIG. 9A & 9B demonstrates a more developed embodiment 90 of the inventive method of the permanent user operating the system 70 or software 80 as a flow chart in accordance with the invention.
Figure 9B:
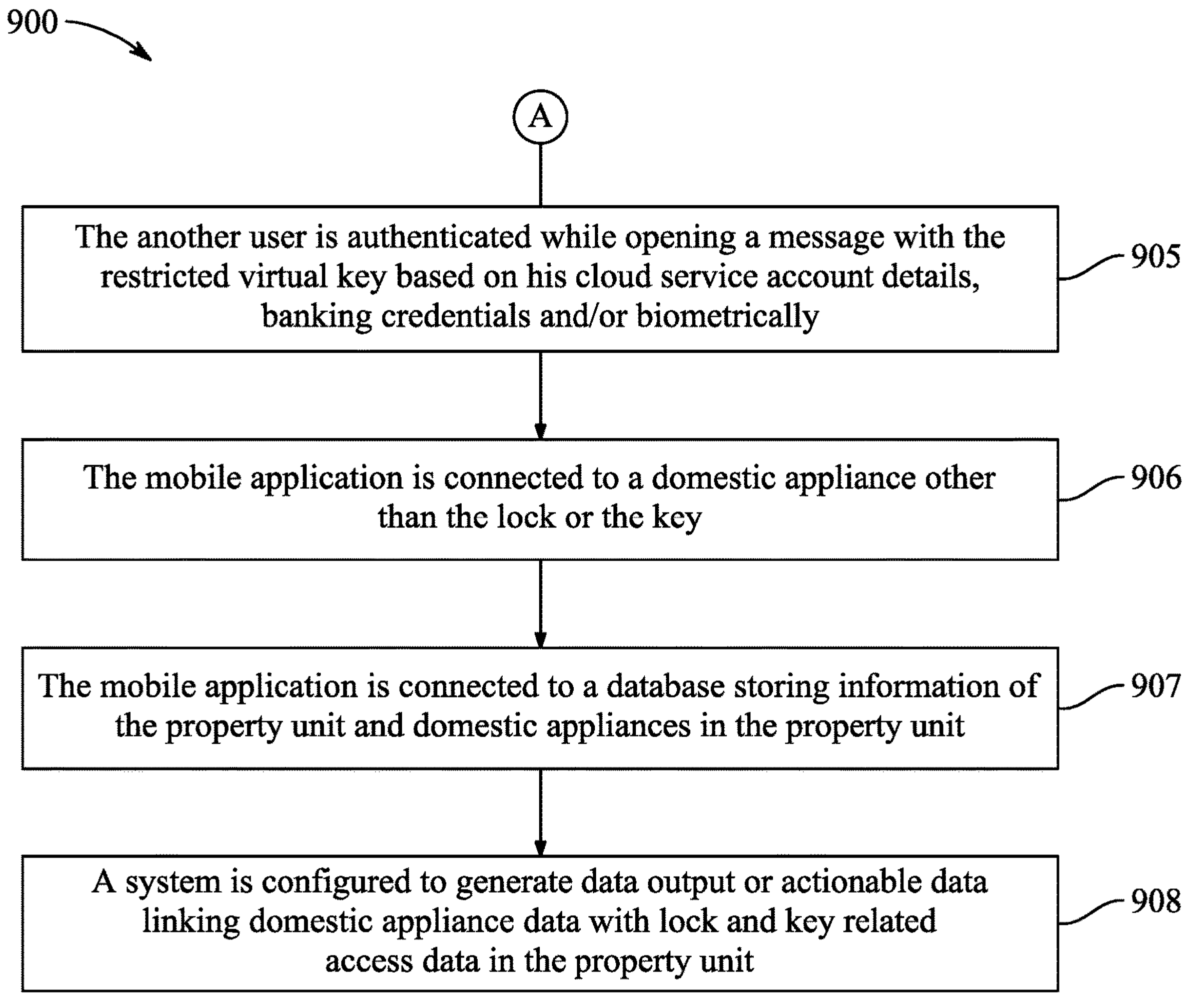

FIG. 9 demonstrates a more developed version 90 of embodiment 30, with the method 900 shown in FIGS. 9A and 9B.

In phase 901, the mobile device 716 has a mobile application 707 connected to a cloud server 713 configured to store a virtual key 718 for facilitating locking or unlocking of a door with a lock 703. The mobile application 707 features toggles 804 for controlling access to parts of a property unit 702, such as any of: main entrance, back entrance, garage door, intercom, or the like. Similarly, the mobile application 707 may feature toggles 806 for reserving access to parts of the property unit, such as any of: gym, laundry room, meeting room, and sauna. The virtual key is configured to be sent to, and optionally received from, a second mobile application 113 also connected to the cloud server 111, 713.

In phase 902, a permanent user 105 of the property unit 702 or vehicle 701 configures a restricted virtual key 718 in the mobile application 707. The restricted virtual key will only open a restricted set of doors from all doors in the property unit 702 or vehicle 701, and/or will only open one or more doors for a restricted period of time. Typically, at least one door has a near field communication (NFC) reader, which is configured to read the restricted virtual key 718 and open the lock in the door 703 if the restricted virtual key grants access through the door at the time when the restricted virtual key is being used.

In phase 903, the permanent user 105 sends the restricted virtual key to another user via a communication network 715. At least one of the locks opened by the restricted virtual key is typically a self-powered lock deriving its operating power from insertion of the virtual key via an NFC connection.

In phase 904, another user 723 receives the restricted virtual key 718 into a mobile application 707 or a messaging inbox 721 on his mobile device. The other user 723 opens the restricted set of doors during the restricted period of time at the property unit 702 or vehicle 701 using the restricted virtual key 718. Typically, the restricted virtual key 718 is a code that comprises an access key to the property unit 702 or vehicle 701, and a block list, listing blocked locations, and blocked times for locations and/or doors. The restricted virtual key is typically in alphanumeric or binary data form to keep the data footprint low, and consequently the power consumption of the system 700 low.

In phase 905, another user 723 is authenticated while opening a message 801 with the restricted virtual key 718 based on his cloud service account details 802 which may include user ID and/or password, electronic banking credentials and/or biometrically, which might involve the recording of a fingerprint and/or facial scan. Typically, the restricted virtual key 718 only works to open the lock, if the authenticated user is the intended user of the restricted virtual key 718.

In phase 906, the mobile application 707 is connected to a domestic appliance 413 other than the lock or the key. The domestic appliance 413 could be for example any of the following: dishwasher, laundry machine, vacuum cleaning drone, heater, air conditioning device, oven, swimming pool control devices, lighting and/or refrigerator.

In phase 907, the mobile application 707 is connected to a database 414 storing information of the property unit 702 and domestic appliances 413 in the property unit 702. This information may involve user manuals of the domestic appliances 413 and operational information required to operate the domestic appliances either manually or automatically or both.

In phase 908, the system 700 is configured to generate data output 418 or actionable data 417 linking domestic appliance data 415 with lock and key related access data 416 in the property unit 702. As the other user 723 enters the property 702 with the restricted virtual key, the domestic appliances 413 are operated in accordance with his restricted virtual key 718, and/or the other user 723 is provided with access to operating instructions of the one or more domestic appliance in accordance with his restricted virtual key 718.

Any features of embodiment 90 may be readily combined or permuted with any of the other embodiments 10, 20, 30, 40, 50, 60, 70, 80, 91, 92 and/or 93 in accordance with the invention.

Figure 10:
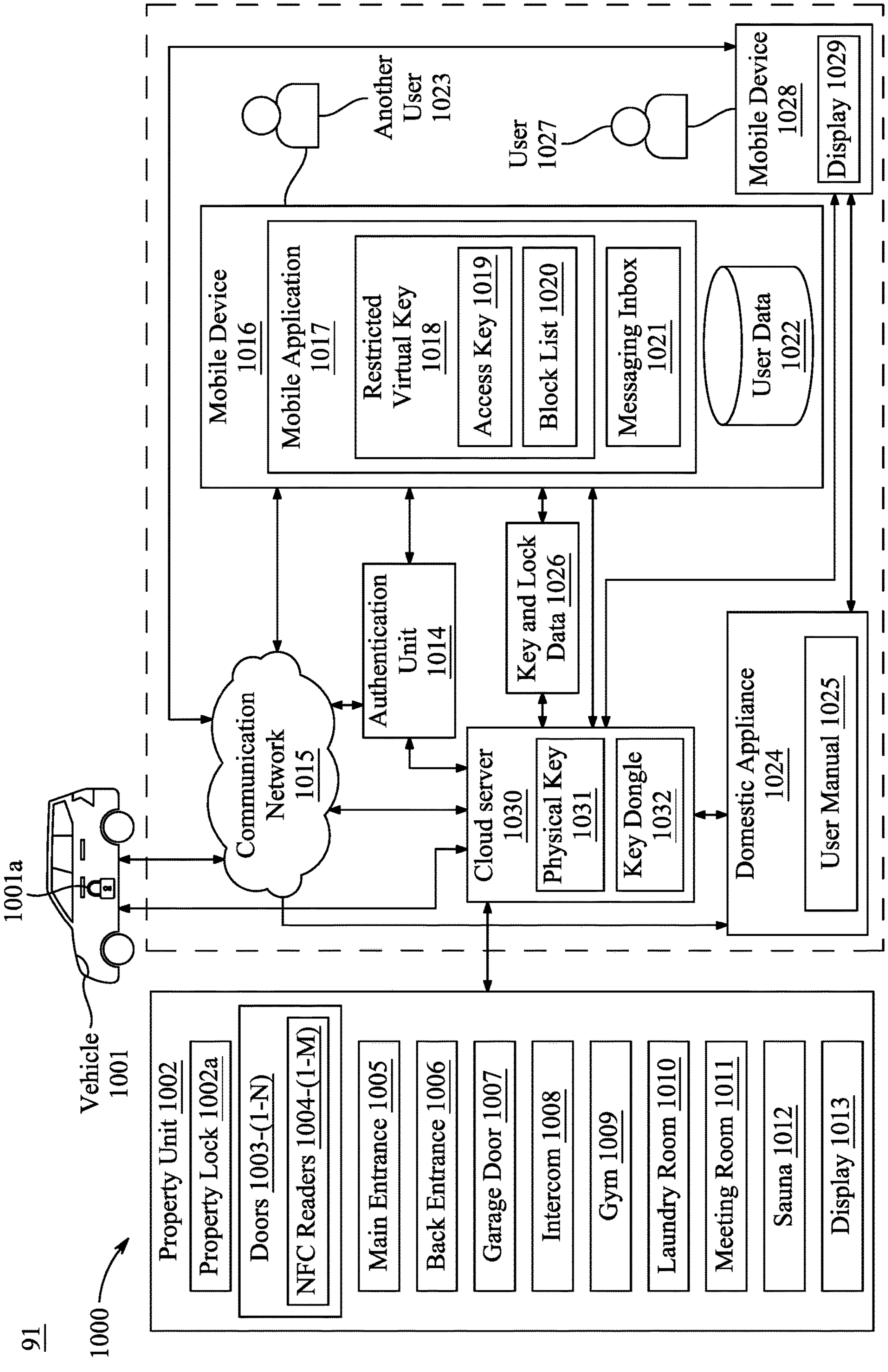
FIG. 10 demonstrates a more developed embodiment 91 of the inventive system for locking and unlocking at least one door to a property unit or a vehicle, integrated with domestic appliances, as a block diagram.

FIG. 10 demonstrates a more developed version 91 of embodiment 40. Embodiments 91, 92 and 93 describe essentially the same embodiment, the differentiator being that embodiment 91 describes how aspects of the invention work as a system, embodiment 92 how aspects of the invention work as software, and embodiment 93 describes the use method and user experience of the system 1000 and software 1100.

Here a domestic appliance 1024 is turned on or off based on a change or anticipated change in key and lock data 1026. Furthermore, a user manual 1025 file of a domestic appliance 1024 is displayed to a user of the property unit 1002 on a display in the property 1002 or on the mobile device display 1016 based on virtual key and lock data 1026.

Another user 1023 receives the restricted virtual key into a mobile application 1017 or into a messaging inbox 1021 on his mobile device 1016. In some embodiments the messaging inbox 1021 may be the email inbox of another user 1023, or text message inbox of another user 1023, or social media message inbox of another user 1023. The messaging inbox may be realized into the mobile application 1017, or it may be a separate messaging inbox in accordance with the invention.

The permanent user 1027 sends the restricted virtual key to another user 1023 as before. The restricted virtual key 1018 may open the restricted set of doors during an optionally restricted time at the property unit 1002. Another user 1023 is authenticated while opening the message with the restricted virtual key 1018, and the restricted virtual key 1018 only works, if the authenticated person is the intended user of the restricted virtual key 1018. Typically, the recipient of the restricted virtual key 1018 is authenticated based on his cloud service account details, such as iCloud, or Google Cloud or Facebook credentials, or other social media credentials, or electronic banking credentials, PIN code, security questions and/or biometrically. Biometric authentication may use any biometric method of authentication that is present in the mobile device 1016, such as fingerprint, facial scan, or the like.

The mobile application 1017 features toggles for controlling access to parts of the property unit 1002, such as any of the following: main entrance 1005, back entrance 1006, garage door 1007, intercom 1008. The mobile application 1017 also features toggles for reserving access to parts of the property unit 1002, such as any of the following: Gym 1009, Laundry room 1010, Meeting Room 1011, Sauna 1012.

Typically, the virtual restricted key 1018 is a code that comprises an access key to the property unit 1002 or vehicle 1001. In some embodiments the virtual restricted key 1018 comprises a block list 1020, listing blocked locations, and blocked times for locations.

Typically, at least one door 1003 has an NFC reader 1004, which is configured to read the restricted virtual key 1018, and open the lock in the door 1003, if the restricted virtual key 1018 grants access through the door at the time of reading the restricted virtual key 1018. Also, a physical key or a key dongle configured to open a door of the property 1003 is linked into the cloud account of the system 1000 in some embodiments. This allows restricted virtual key 1018 to be transmitted also to the memory of physical keys 1031 or key dongles 1032. Typically, this type of physical key or key dongle comprises a memory chip, a battery, or some other power source, such as a photovoltaic cell, and an NFC transceiver.

Any features of embodiment 91 may be readily combined or permuted with any of the other embodiments 10, 20, 30, 40, 50, 60, 70, 80, 90, 92 and/or 93 in accordance with the invention.

FIGS. 11A-G demonstrate a more developed version 92 of embodiment 50.

The software program product 1100 is stored in a non-transient memory medium for locking and unlocking at least one door 1003 to a property unit 1002, operable in a system comprising a cloud server 1030, a mobile device 1016 used by another user 1023 and a permanent user 1027, and a communication network 1015. The mobile device 1016 has a mobile application 1017 connected to the cloud server 1030 configured to store a virtual key 1018 for facilitating the locking or unlocking of a door 1003 with a lock 1002*a*. The virtual key 1018 is configured to be sent to mobile application 1017 from the mobile device 1028 also connected to the cloud server 1030.

Figure 11A:
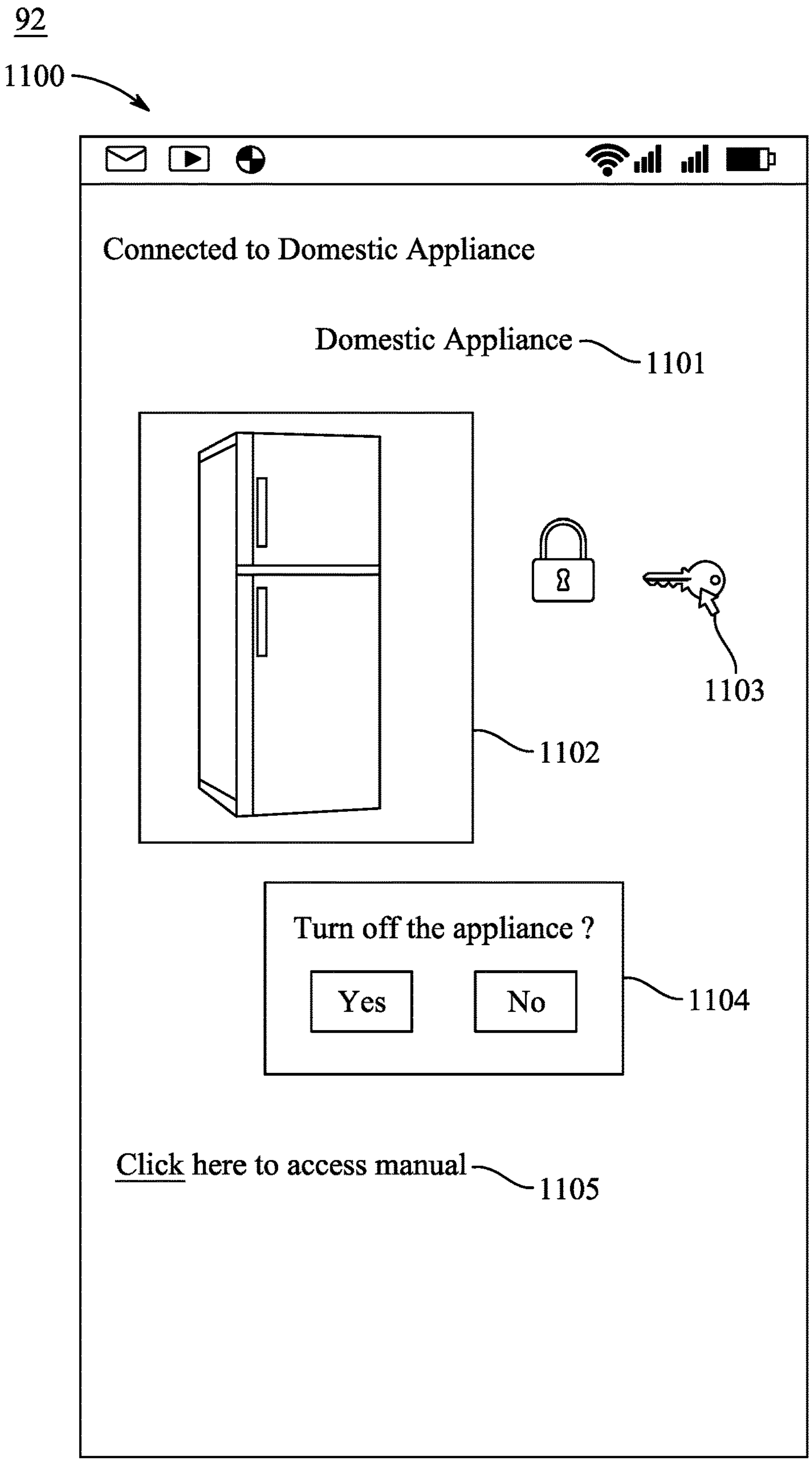
FIGS. 11A-11G demonstrates a more developed embodiment 92 of the inventive user interface diagram of an inventive software program product for locking and unlocking at least one door to a property unit or a vehicle, integrated with domestic appliances.

A permanent user 1027 of the property unit 1002 or vehicle 1001 may configure the restricted virtual key 1018 in his mobile application 108, 406. The restricted virtual key 1018 is configured to open at least one door lock 1002*a* in the property unit 1002. The mobile application 108 is also connected to a domestic appliance 1101 other than the lock or the key. The domestic appliance, shown as a refrigerator 1102 in FIG. 11A, is turned on or off based on a change or anticipated change in key and lock data, as shown by toggle 1104. For example, the refrigerator may be turned on when key and lock data shows that a restricted virtual key 1018 may open doors in the property unit in 24 hours.

Figure 11B:
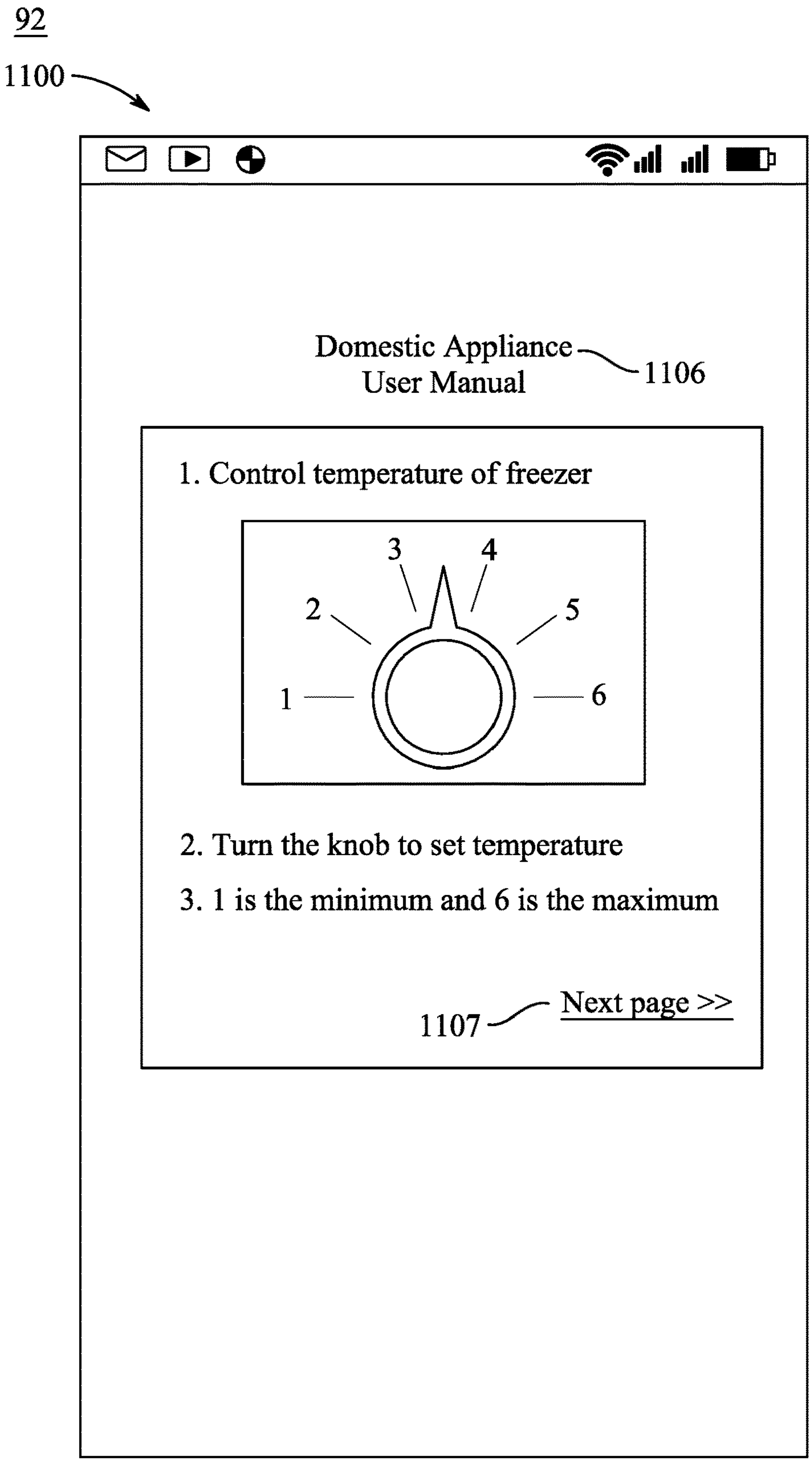

Typically, the mobile application 108, 406 is connected to a database 414 storing information of the property unit 1002 and domestic appliances 1101 in the property unit 1002. The system 1100 is configured to generate data output 418 or actionable data 417 linking domestic appliance data 415 with lock and key related access data 416 in the property unit 1002. A user manual file 1025 of a domestic appliance 1101 is accessed 1105 and displayed in the property unit 1002 on a display within the property 1002 or on the mobile device 1016, 1028 screen based on virtual key and lock data. As shown in FIG. 11B, the user manual instructs the users on how to operate the refrigerator freezer combination 1101.

Figure 11C:
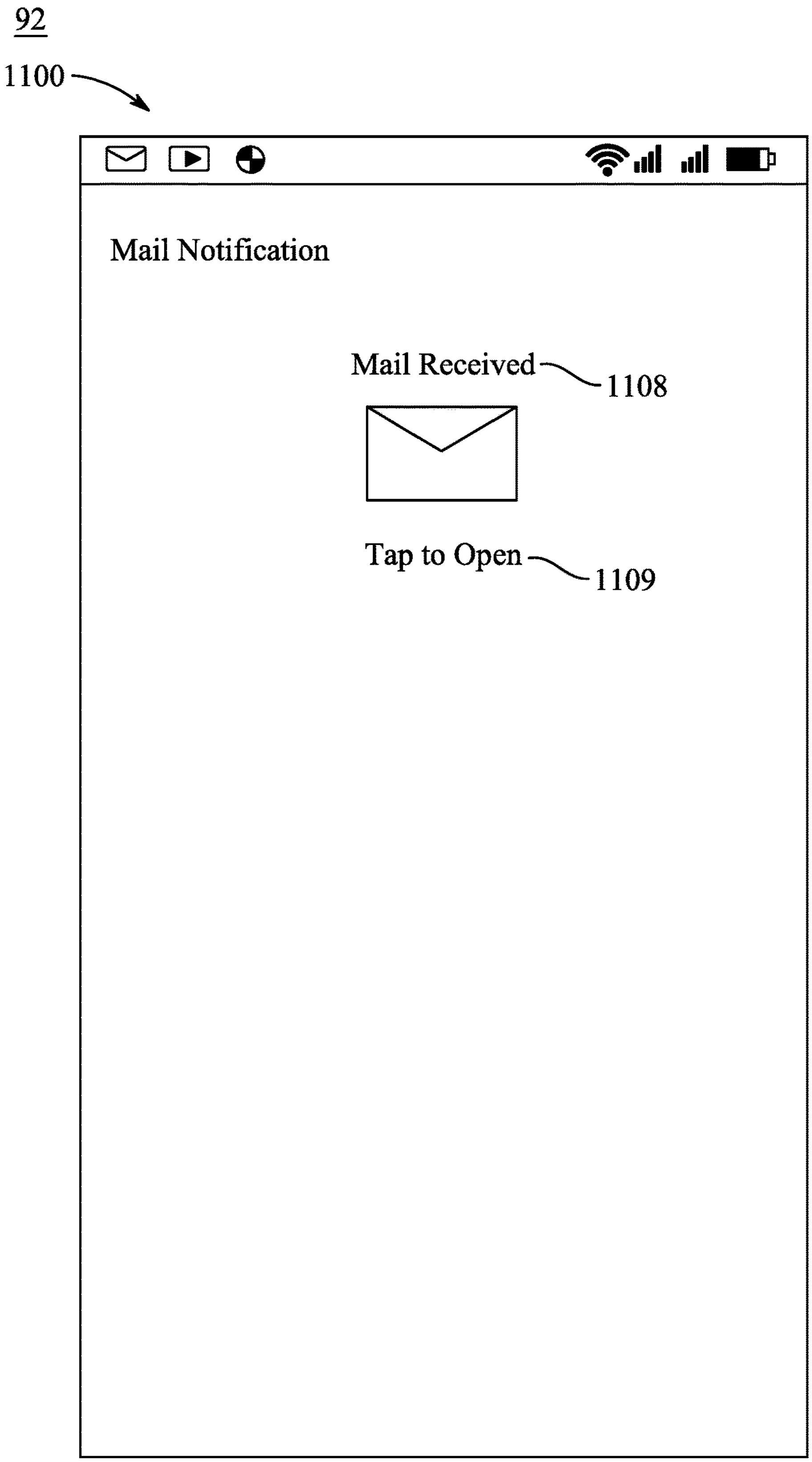
Figure 11D:
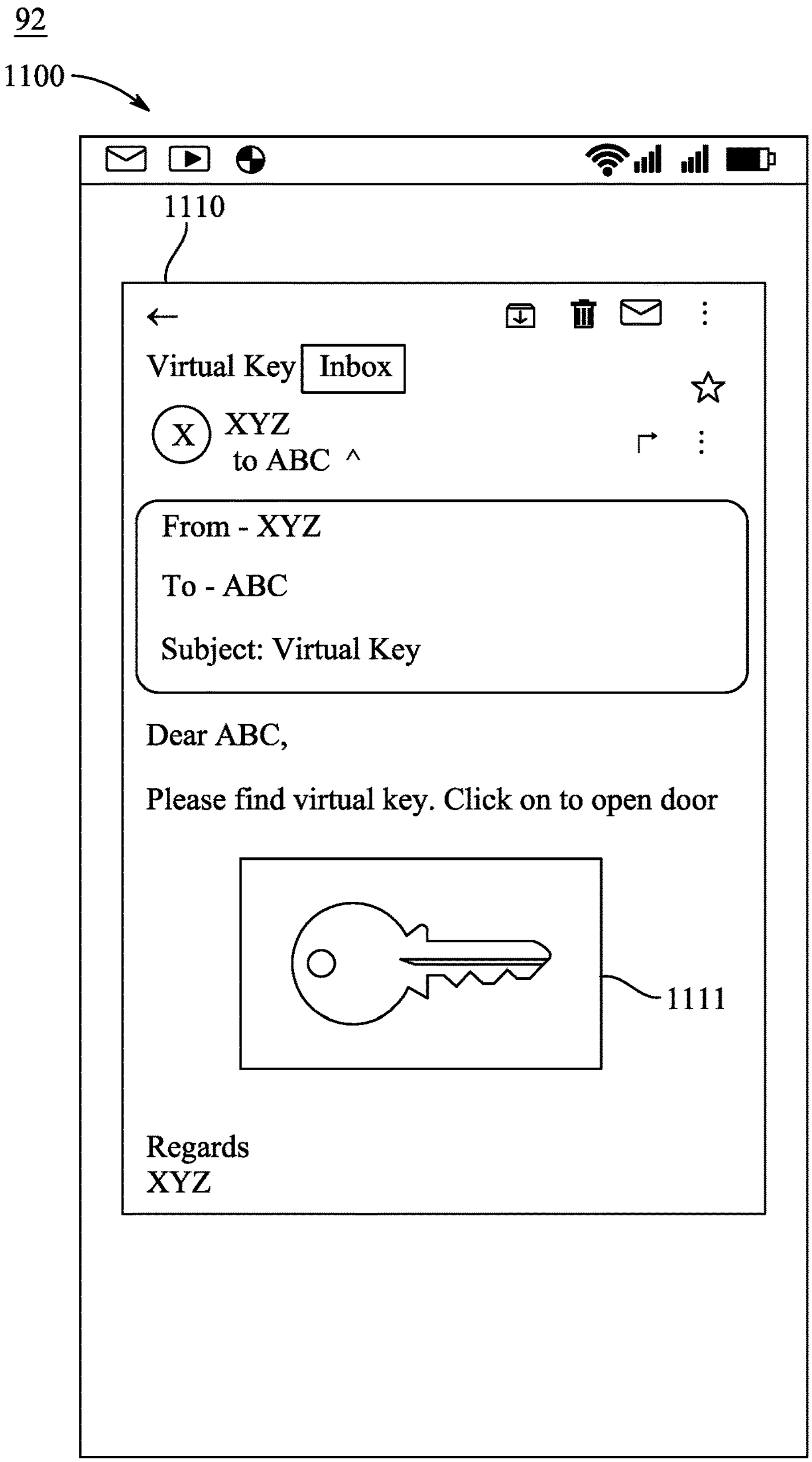

Another user 1023 receives the restricted virtual key 1018 into a mobile application 1017 on his mobile device 1016 as shown in FIG. 11C. FIG. 11D shows how the other user 1023 receives the restricted virtual key 1018 into a messaging inbox 1021 on his mobile device 1016. In some embodiments, the restricted virtual key 1018, 110 is integrated into a welcoming email or message as shown in FIG. 11D. In some embodiments the virtual key or restricted virtual key may be activated by just tapping the icon 1111 in the message, and this causes the virtual key 109 or the restricted virtual key 1018 to be transmitted via NFC from the mobile device 1016, 1028.

Figure 11E:
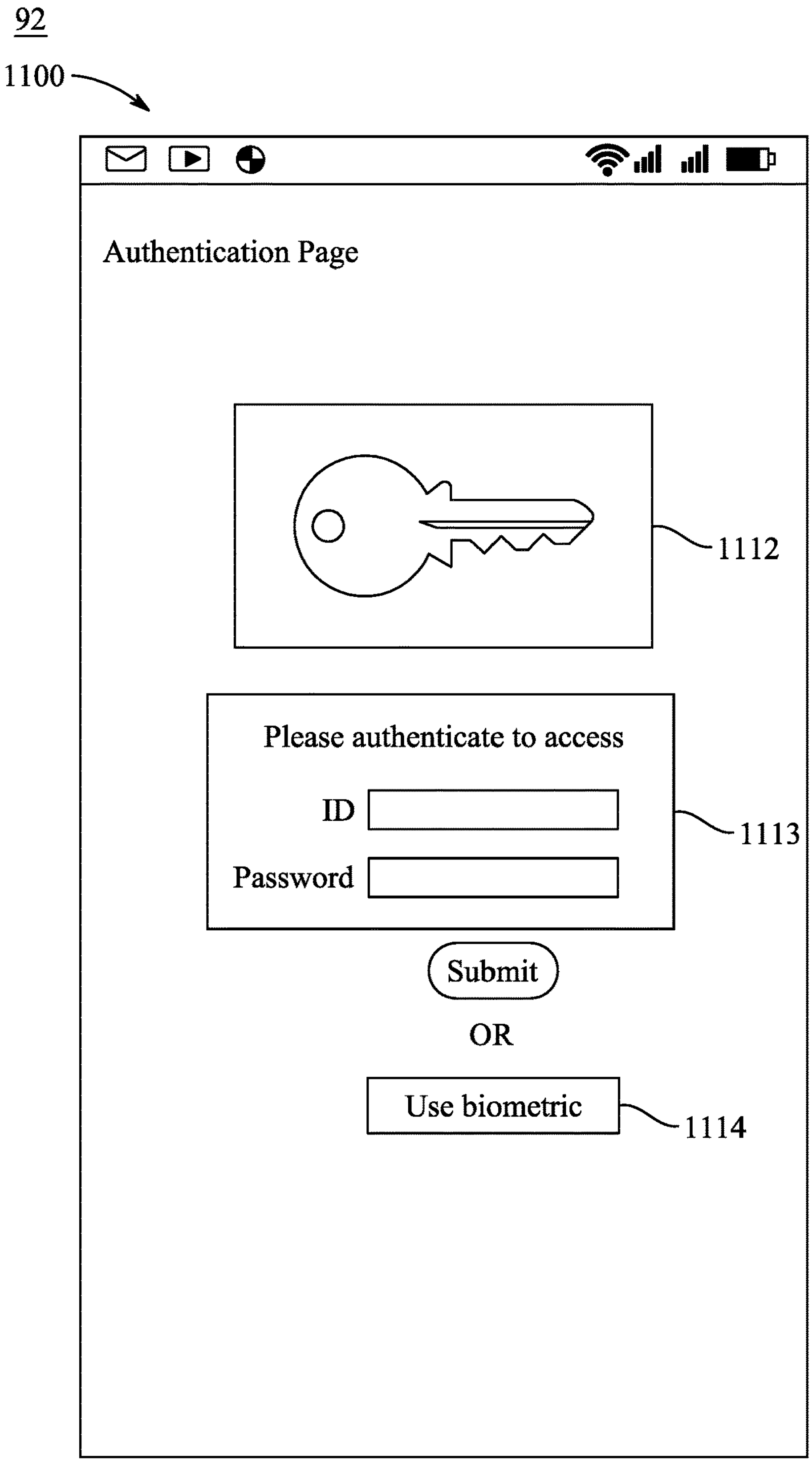

Another user 1023 may open the restricted set of doors during the restricted time at the property unit 1002 using the restricted virtual key 1018. In FIG. 11E another user 1923 is authenticated while opening the message with the restricted virtual key, and the restricted virtual key 1018 only works, if the authenticated person is the intended user of the restricted virtual key 1018. The recipient of the restricted virtual key 1018 is authenticated based on his cloud service account details 1113, electronic banking credentials and/or biometrically 1114.

Figure 11F:
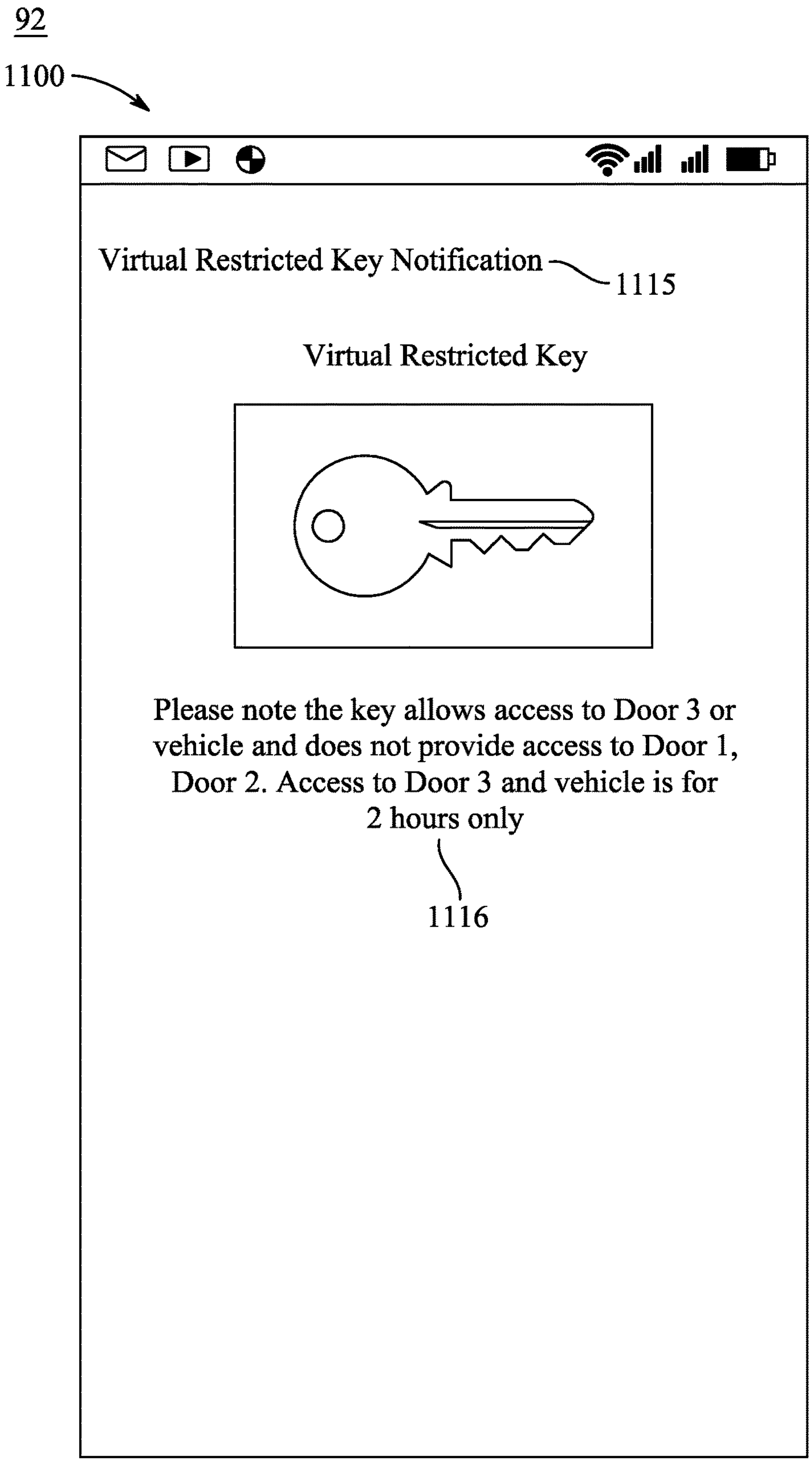

Turning to FIG. 11F; the mobile application 108, 200 featured toggles for controlling access to parts of the property unit 102, 1002, such as any of the following: Main entrance, Back entrance, Garage door, Intercom. The mobile application 108, 200 featured toggles for reserving access to parts of the property unit 102, 1002, such as any of the following: Gym, Laundry room, Meeting Room, Sauna.

In FIG. 11F, these restrictions are explained to another user 1023 in receipt of the virtual restricted key 1018, in screen section 1116. Aspects of the invention make it possible, for example, to co-ordinate car sharing, as the car 1001 is allocated for two hours to another user 1023, as shown in screen section 1116.

Figure 11G:
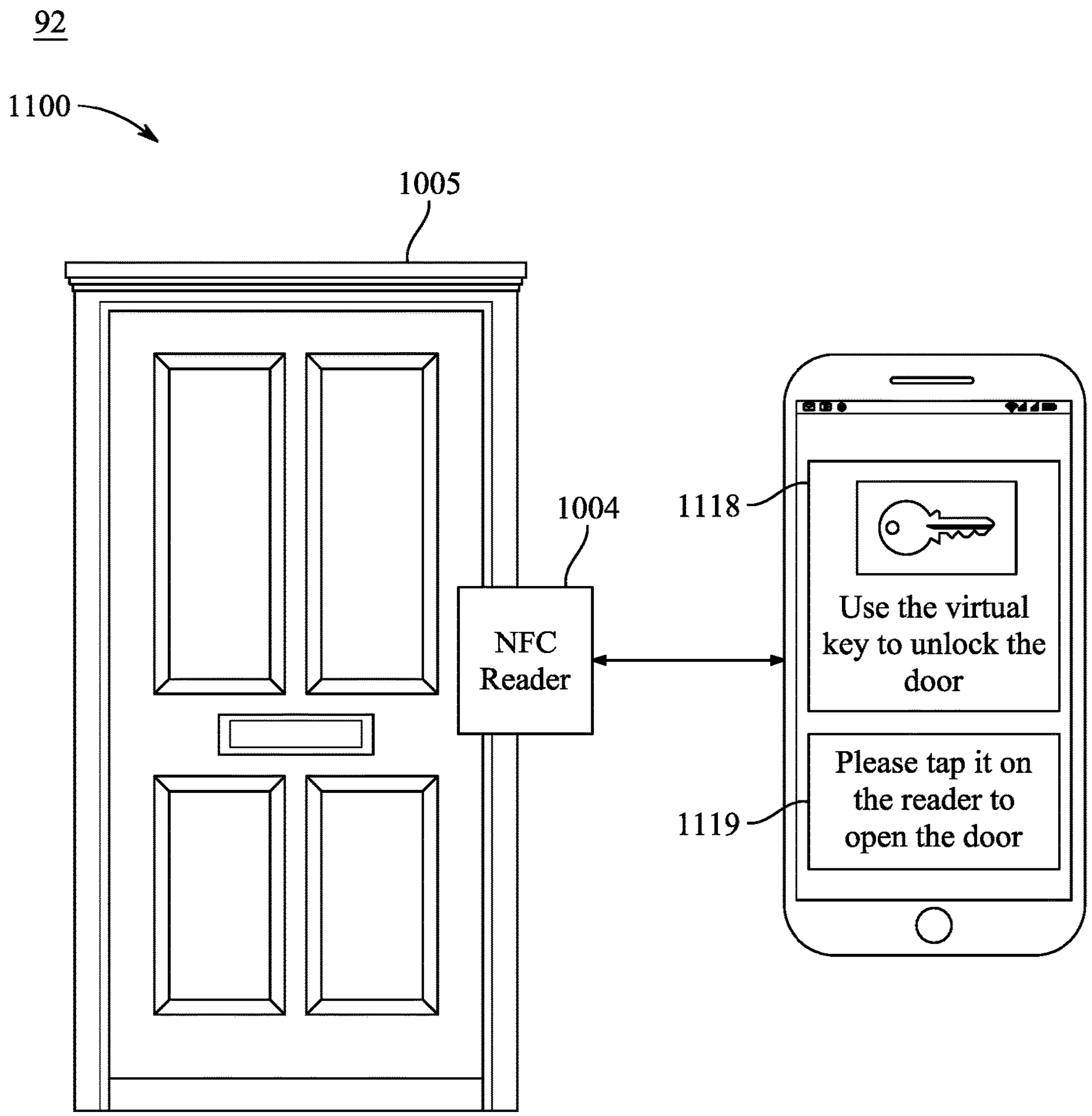

The virtual restricted key 1018 is a code that comprises an access key to the property unit 1002 or vehicle 1001, and possibly a block list, listing blocked locations, and blocked times for locations. FIG. 11G shows the opening process of at least one door, which has an NFC reader 1004, which is configured to read the restricted virtual key 1018, and open the lock in the door 1005 of the main entrance, if the restricted virtual key 1018 grants access through the door at the current time. As shown in FIG. 11, the mobile application 1017 of another user 1023 can guide another user through the process of using the restricted virtual key 1018, with operating instructions as shown in screen section 1118, 1119.

In some embodiments, the virtual restricted key 1018 may be transmitted to a physical key 1031, or a key dongle 1032, which is configured to open a door of the property 1002 and is linked into the cloud account of the system 1100. The physical key 1031, or key dongle 1032, typically does not have a screen, but in some embodiments, it can output instructions via Bluetooth or NFC to a screen on another device, for example a mobile device 1016, 1028.

Any features of embodiment 92 may be readily combined or permuted with any of the other embodiments 10, 20, 30, 40, 50, 60, 70, 80, 90, 91 and/or 93 in accordance with the invention.

Figure 12A:
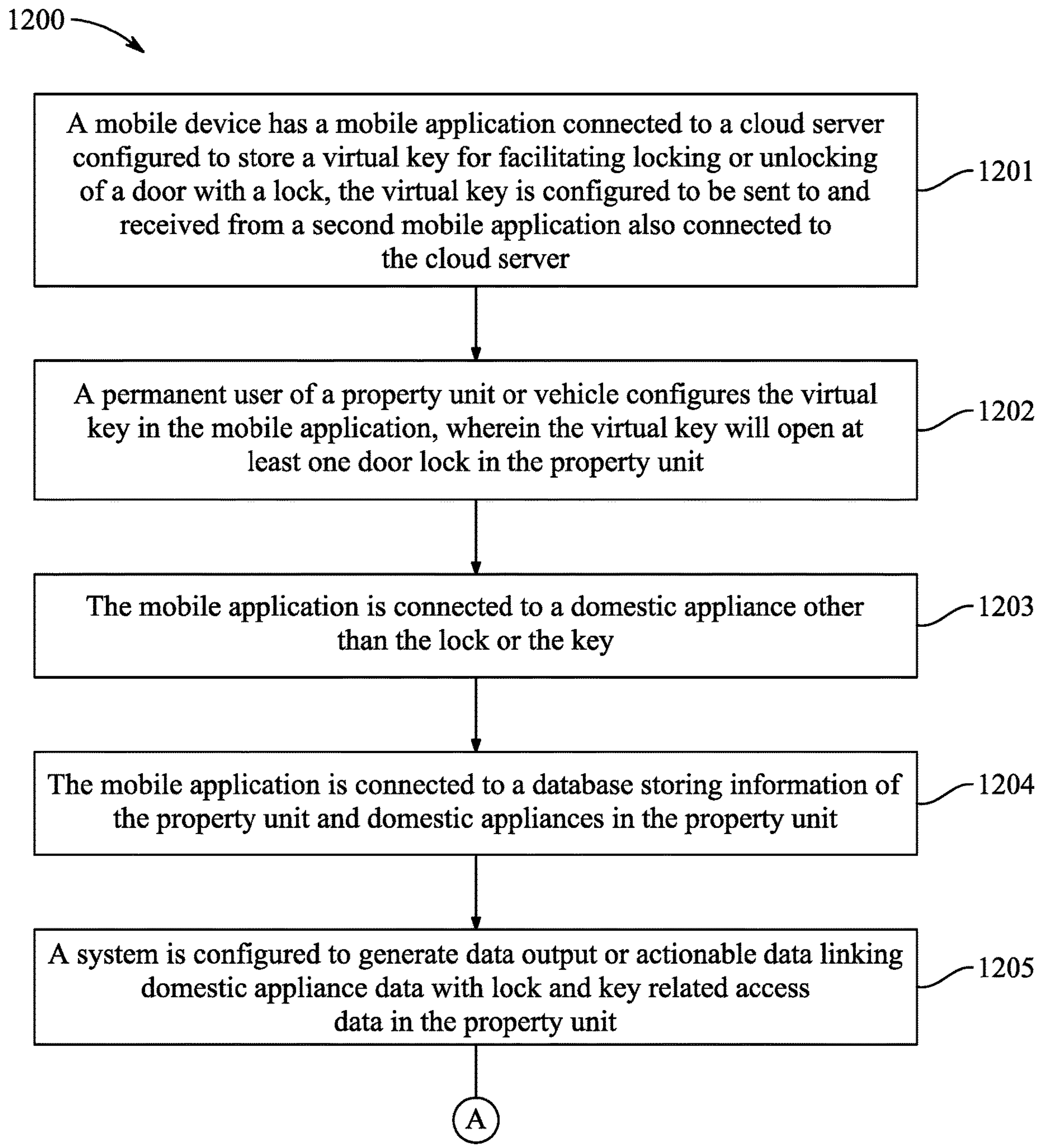
FIGS. 12A & 12B demonstrates a more developed embodiment 93 of the inventive method of the permanent user operating the system 91 or software 92 as a flow chart in accordance with the invention.
Figure 12B:
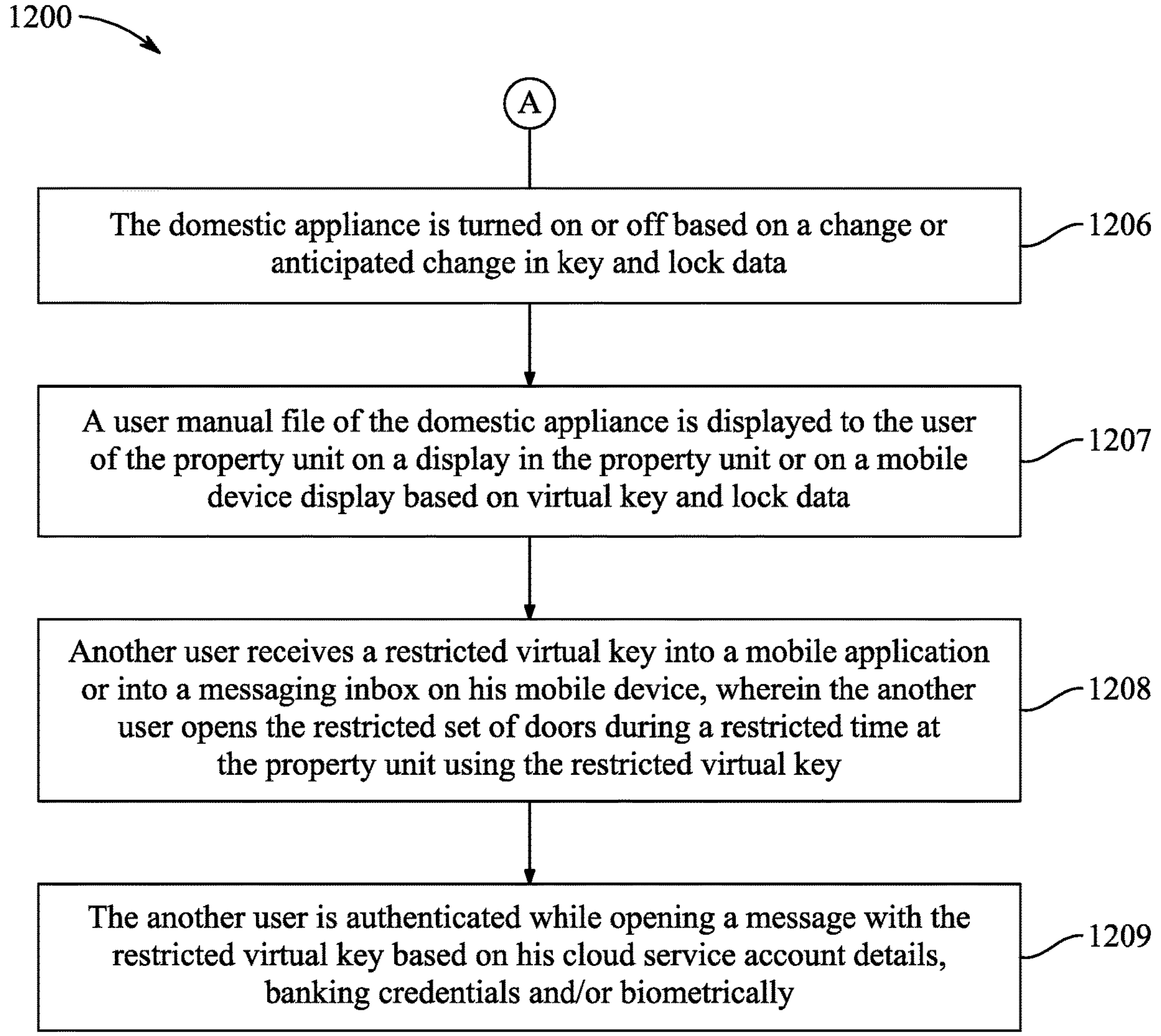

FIGS. 12A&B demonstrate a more developed embodiment 93 of embodiment 60.

In phase 1201 the mobile device 1028 has a mobile application (not shown) connected to a cloud server 1030 configured to store a virtual key for facilitating locking or unlocking of a door with lock 1002*a*. The mobile application features toggles for controlling access to parts of a property unit 1002, such as any of Main entrance 1005, Back entrance 1006, Garage door 1007, Intercom 1008. The mobile application of mobile device 1028 also preferably features toggles for reserving access to parts of the property unit 1002, such as any of Gym 1009, Laundry room 1010, Meeting room 1011, and Sauna 1012. The virtual key is configured to be sent to, and optionally received from, a second mobile application 1017 used by another user 1023, also connected to the cloud server 1030.

In phase 1202 a permanent user of the property unit 1002 or vehicle 1001 configures the virtual key in the mobile application of mobile device 1028, and the virtual key will open at least one door lock 1002*a* in the property unit 1002. The at least one door has a near field communication (NFC) reader 1004, which is configured to read the restricted virtual key 1018 and open the lock 1001*a*, 1002*a*, in the door if the restricted virtual key 1018 grants access through the door at the time of use.

In phase 1203 the mobile application of mobile device 1028 is connected to a domestic appliance 1024 other than the lock or the key. This may be for example the refrigerator as shown in FIGS. 11A-11G, or any other household appliance.

In phase 1204 the mobile application of mobile device 1028 is connected to a database 414 storing information of the property unit 1002 and domestic appliances 1024 in the property unit 1002.

In phase 1205 the system 1000 is configured to generate data output 418 or actionable data 417 linking domestic appliance 1024 data with lock and key related access data 416 in the property unit 1002. When all or some of the phases 1201-1205 have been executed, the restricted virtual key 1018 is sent to mobile application 1017 of another user 1023, who in this case will be using property 1002 and/or vehicle 1001 with the restricted virtual key 1018. Alternatively, the phases 1206 & 1207 preparing the property 1002 for the use of another user 1023 are executed first, and the restricted virtual key is sent in phase 1208.

In phase 1206 the domestic appliance 1024 is turned on or off based on a change or anticipated change in key and lock data. For example, if another user 1023 is anticipated to enter the property in 24 hours the refrigerator could be automatically switched on. Similarly, if another user 1023 is anticipated to use the vehicle 1001, the air conditioning appliance or the heater in the vehicle could be turned on based on the surrounding temperature and the anticipated time of the start of the drive.

In phase 1207 a user manual file 1025 of the domestic appliance 1024 is displayed to another user of the property unit 1002 on a display in the property unit 1002 or on a mobile device 1016 display based on restricted virtual key 1018 and lock data 1026.

In phase 1208 another user 1023 receives the restricted virtual key 1018 into mobile application 1017 or into a messaging inbox 1021 on his mobile device. The other user 1027 may open the restricted set of doors during a restricted time at the property unit 1002 using the restricted virtual key 1018, wherein the restricted virtual key 1018 is a code that comprises an access key to the property unit 1002 or vehicle 1001. The restricted virtual key 1018 may also comprise a block list, listing blocked locations, and blocked times for locations.

In phase 1209 another user 1023 is authenticated while opening the message with the restricted virtual key 1018 based on his cloud service account details, electronic banking credentials and/or biometrically. The restricted virtual key 1018 only works, if the authenticated user is the intended user of the restricted virtual key 1018.

In some embodiments a physical key 1031 or a key dongle 1032 configured to open a door of the property is linked into the cloud account of the system 1000. In some embodiments, this allows the once authenticated another user 1023 to move the restricted virtual key 1018 to the physical key 1031 and/or key dongle 1032 through the communication network 1015. Another user 1023 can then open the locks 1001*a*, 1002*a* or property doors 1003 subject to the restrictions of course, without the mobile device 1016, or without reauthentication, using the physical key 1031 and/or key dongle 1032 that he carries with him.

Any features of embodiment 93 may be readily combined or permuted with any of the other embodiments 10, 20, 30, 40, 50, 60, 70, 80, 90, 91 and/or 92 in accordance with the invention.

The virtual key system is henceforth explained to utilize Artificial Intelligence for several purposes. Known machine learning tools/deep learning frameworks may be utilized with or without modifications. A few such known machine learning tools comprise Caffe™, Api.ai™, TensorFlow™, Mahout™, OpenNN™, H20™, MLlib™, NuPIC™, OpenCyc™, Oryx 2™, PredictionIO™, SystemML™, TensorFlow™, and Torch™. Artificial Intelligence may be used to co-ordinate, for example, domestic appliance operation in response to actionable data 417 or data output 418. However, the virtual key data itself is preferably kept completely deterministic without any machine learning aspects.

The virtual key can be received to a mobile application, to a physical key or a key dongle, to a messaging software inbox, to a software Wallet, such as the Apple Wallet or Google Wallet, to a server device or cloud account, or to a device such as a drone or a self-driving car in some embodiments of the invention. Further, in one preferable embodiment the virtual key is offered as an App Clip from Apple™ or Google Play Instant from Google™, which allow users to use the virtual key 109 or restricted virtual key 110 without installing the second mobile application 113.

In some preferable embodiments of the invention the mobile application 108 or the second mobile application 113 is adaptive to user roles. For example, there can be user roles as "permanent user" or "temporary user" as described in the earlier embodiments. The mobile application 108 and/or second mobile application can be realized as modular software, where the user views or the availability of different software modules depends on the user role of the user using the mobile application 108 and/or the second mobile application. For example, the user with the "permanent user" user role could be offered user views of everything in the property that he/she owns. The user with the user role of "temporary user" could be offered user views of only those rooms, facilities and domestic appliances that are allowed to be used by this another user 114 with the restricted virtual key 110. In practice, the user data is hosted in the cloud servers, and the user's mobile application 108, 113 may be updated with a user role from the cloud server 111. As the user role is updated in the mobile application 108, 113, the user interface 200, 1100 of the mobile application 108, 113 adapts to the current user role to display only those software modules and user views, which have been given to the current user role in the system 100, 400, 700 and/or 1000. These user roles are applicable to all earlier described embodiments of the invention.

A typical software architecture for realizing the aforementioned user roles ties the user roles with the estate structure of the property unit 1002, which estate structure will contain the floor plans, locks, access points, access rights, keys. The estate structure may also have virtual levels, for example country, or region, to help in managing an estate with two or more property units 1002 in two or more countries or regions. When a new person is added to the system 100, 400, 700, 1000, a user role, or many user roles is/are selected for the person. The user role may control access to log views, which show recorded logs of events from different software modules and/or parts of the property unit as a function of time, e.g., "Main entrance remote opened, time, date, name of user who opened the Main entrance". Reservations of facilities, such as Gym, Sauna or the use of domestic appliances 413, can be similarly recorded for each user and their user role in the log views. Similarly, all the physical keys 1031, key dongles 1032 and/or virtual keys 407 for which the user has been given rights to manage, can be shown in a user role-controlled view in accordance with the invention.

In one preferable embodiment the Intercom in 800 of the property unit is contacted by a guest. The intercom may then call the user of the property, and the Intercom connects to the mobile application 108, 113 in the user device, and the speech received by the Microphone of the Intercom from the guest is transmitted via a connection from the Intercom to the mobile application 108, 113 and the user of the property hears the guest using the Intercom. In some embodiments the Intercom provides a QR code, or NFC call tag that allows the person at the entrance to call the resident directly.

The user views can be adapted to different screen sizes too in accordance with defined user roles. For example, public information compatible with generic "resident" role could be displayed on a big screen in the lobby of the building or property unit, in addition to mobile phone screens and tablet screens.

The invention has been explained above with reference to the aforementioned embodiments and several commercial and industrial advantages have been demonstrated. The methods and arrangements of aspects of the invention allow programmable residential rights to be exchanged between the tenant/visitor users using mobile apps and self-powered locks. Physical keys and lock power sources can be eliminated altogether, while still keeping the key-lock fleet completely programmable. This results in ease of use for the tenants and low cost for the property owners without making compromises on security.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

US11468723, ACCESS MANAGEMENT SYSTEM, Ronald Carter.

US11421445, SMART LOCK DEVICE WITH NEAR FIELD COMMUNICATION. Johnson & Dow.

The invention claimed is:

1. A system for locking and unlocking at least one door to a property unit or a vehicle, comprising a cloud server, a mobile device used by a user and a communication network, wherein the mobile device has a mobile application connected to the cloud server configured to store a virtual key for facilitating the locking or unlocking a lock of a door, wherein the virtual key is configured to be sent to a second mobile application also connected to the cloud server, wherein the mobile application is arranged to be used by a permanent user of the property unit or vehicle to configure a restricted virtual key, wherein the restricted virtual key will at least one of: (i) only open a restricted set of doors from all doors in the property unit or vehicle, or (ii) only open one or more doors for a restricted period of time, wherein the restricted virtual key is configured to be sent by the permanent user to another user via a communication network to a messaging inbox of a second mobile device associated with the other user, and the restricted virtual key from the messaging inbox is configured to allow the other user to open the restricted set of doors during the restricted period of time at the property unit or vehicle by user activation of the restricted virtual key in a message or an email received in the messaging inbox, causing the restricted virtual key to be transmitted via near field communication (NFC) to a lock, wherein user activation of the restricted virtual key comprises tapping an icon integrated into the message or the email, the icon being representative of the restricted virtual key, wherein the restricted virtual key is a code that comprises both an access key to the property unit or vehicle, and a block list listing blocked locations and blocked times for locations, wherein the door has an NFC reader which is configured to read the restricted virtual key, and open the lock in the door if the restricted virtual key grants access through the door at the time of use, and wherein the lock is a self-powered lock deriving its operating power from insertion of the virtual key via an NFC connection from the messaging inbox.

2. A system as claimed in claim 1, wherein, the restricted virtual key is configured to be used to authenticate the other user while opening a message, and the restricted virtual key is configured to work only if the authenticated person is an intended user of the restricted virtual key.

3. A system as claimed in claim 1 wherein the restricted virtual key is configured to authenticate a recipient based on at least one of: (i) the recipient's cloud service account details, (ii) the recipient's electronic banking credentials, or (iii) biometric data of the recipient.

4. A system as claimed in claim 1 wherein the mobile application comprises a first one or more toggles for controlling access to a first one or more parts of the property unit, the first one or more parts of the property unit comprising at least one of: (i) a main entrance, (ii) a back entrance, (iii) a garage door, or (iv) an intercom, and wherein the mobile application comprises a second one or more toggles for reserving access to a second one or more parts of the property unit, comprising at least one of: (v) a gym, (vi) a laundry room, (vii) a meeting room, or (viii) a sauna.

5. A software program product, stored in a non-transient memory medium, for locking and unlocking at least one lock in a door to a property unit or a vehicle, operable in a system comprising a cloud server, a mobile device used by a user and a communication network, wherein the mobile device has a mobile application connected to the cloud server configured to store a virtual key for facilitating the locking or unlocking of a door with a lock, wherein the virtual key is configured to be sent to a second mobile application also connected to the cloud server, wherein the mobile application is arranged to be used by a permanent user of the property unit or vehicle to configure a restricted virtual key, wherein the restricted virtual key will at least one of: (i) only open a restricted set of doors from all doors in the property unit or vehicle, or (ii) only open one or more doors for a restricted period of time, wherein the restricted virtual key is configured to be sent by the permanent user to another user via a communication network to a messaging inbox of a second mobile device associated with the other user, and the restricted virtual key from the messaging inbox is configured to allow the other user to open the restricted set of doors during the restricted period of time at the property unit or vehicle by user activation of the restricted virtual key in a message or an email received in the messaging inbox, causing the restricted virtual key to be transmitted via near field communication (NFC) to a lock, wherein user activation of the restricted virtual key comprises tapping an icon integrated into the message or the email, the icon being representative of the restricted virtual key, wherein the restricted virtual key is a code that comprises both an access key to the property unit or vehicle, and a block list listing blocked locations and blocked times for locations, wherein the door has an NFC reader which is configured to read the restricted virtual key, and open the lock in the door if the restricted virtual key grants access through the door at the time of use, and wherein the lock is a self-powered lock deriving its operating power from insertion of the virtual key via an NFC connection from the messaging inbox.

6. A software program product as claimed in claim 5, wherein the messaging inbox is an email inbox, a text message inbox, or a social media inbox.

7. A software program product as claimed in claim 5, wherein the restricted virtual key is configured to authenticate the other user while opening a message, and the restricted virtual key is configured to work only if the authenticated person is an intended user of the restricted virtual key.

8. A software program product as claimed in claim 5, wherein the restricted virtual key is configured to authenticate a recipient based on at least one of: (i) the recipient's cloud service account details, (ii) the recipient's electronic banking credentials, or (iii) biometric data of the recipient.

9. A software program product as claimed in claim 5, wherein the mobile application comprises a first one or more toggles for controlling access to a first one or more parts of the property unit, the first one or more parts of the property unit comprising at least one of: (i) a main entrance, (ii) a back entrance, (iii) a garage door, or (iv) an intercom, and wherein the mobile application comprises a second one or more toggles for reserving access to a second one or more parts of the property unit, comprising at least one of: (v) a gym, (vi) a laundry room, (vii) a meeting room, or (viii) a sauna.

10. A system for locking and unlocking at least one lock in a door to a property unit, comprising a cloud server, a mobile device used by a user, and a communication network, wherein the mobile device has a mobile application connected to the cloud server configured to store a virtual key for facilitating the locking or unlocking of a door with a lock, wherein the virtual key is configured to be sent to and received from a second mobile application also connected to the cloud server, wherein the mobile application is arranged to be used by a permanent user of the property unit to configure a restricted virtual key, wherein the virtual key is configured to open at least one door lock in the property unit, wherein the restricted virtual key is configured to be sent by the permanent user to another user via a communication network to a messaging inbox of a second mobile device associated with the other user, the restricted virtual key from the messaging inbox is configured to allow the other user to open a restricted set of doors during a restricted time at the property unit by user activation of the restricted virtual key in a message or an email received in the messaging inbox, causing the restricted virtual key to be transmitted via near field communication (NFC) to a lock, wherein user activation of the restricted virtual key comprises tapping an icon integrated into the message or the email, the icon being representative of the restricted virtual key, wherein the restricted virtual key is a code that comprises both an access key to the property unit, and a block list listing blocked locations and blocked times for locations, and wherein the door has an NFC reader which is configured to read the restricted virtual key, and open the lock in the door if the restricted virtual key grants access through the door at the time of use, wherein the mobile application is connected to a domestic appliance other than the lock or the key, wherein the mobile application is connected to a database storing information of the property unit and one or more domestic appliances in the property unit, and, wherein the system is configured to generate at least one of data output or actionable data linking domestic appliance data with lock and key related access data in the property unit from the messaging inbox.

11. A system as claimed in claim 10, wherein the domestic appliance is turned on or off based on at least one of a change or anticipated change in key and lock data.

12. A system as claimed in claim 10 wherein a user manual file of the domestic appliance is capable of being displayed to a user of the property unit on a display in the property or on the mobile device display based on virtual key and lock data.

13. A system as claimed in claim 10 wherein the messaging inbox is an email inbox, a text message inbox, or a social media inbox.

14. A system as claimed in claim 10 wherein the virtual key is configured to be used to authenticate the other user while opening a message, and the virtual key is configured to work only if the authenticated person is an intended user of the virtual key.

15. A system as claimed in claim 10 wherein the virtual key is configured to authenticate a recipient based on at least one of: (i) the recipient's cloud service account details, (ii) the recipient's electronic banking credentials, or (iii) biometric data of the recipient.

16. A system as claimed in claim 10 wherein the mobile application comprises a first one or more toggles for controlling access to a first one or more parts of the property unit, the first one or more parts of the property unit comprising at least one of: (i) a main entrance, (ii) a back entrance, (iii) a garage door, or (iv) an intercom, and wherein the mobile application comprises a second one or more toggles for reserving access to a second one or more parts of the property unit, comprising at least one of: (v) a gym, (vi) a laundry room, (vii) a meeting room, or (viii) a sauna.

17. A system as claimed in claim 10 wherein at least one of a physical key or a key dongle configured to open a door of the property unit is linked into the cloud account of the system.

18. A software program product, stored in a non-transient memory medium, for locking and unlocking at least one lock of a door to a property unit, operable in a system comprising a cloud server, a mobile device used by a user, and a communication network, wherein the mobile device has a mobile application connected to the cloud server configured to store a virtual key for facilitating the locking or unlocking of a door with a lock, wherein the virtual key is configured to be sent to a second mobile application also connected to the cloud server, wherein the mobile application is arranged to be used by a permanent user of the property unit to configure a restricted virtual key, wherein the virtual key is configured to open at least one door lock in the property unit, wherein the restricted virtual key is configured to be sent by the permanent user to another user via a communication network to a messaging inbox of a second mobile device associated with the other user, the restricted virtual key from the messaging inbox is configured to allow the other user to open a restricted set of doors during a restricted time at the property unit by user activation of the restricted virtual key in a message or an email received in the messaging inbox, causing the restricted virtual key to be transmitted via near field communication (NFC) to a lock, wherein user activation of the restricted virtual key comprises tapping an icon integrated into the message or the email, the icon being representative of the restricted virtual key, wherein the restricted virtual key is a code that comprises both an access key to the property unit, and a block list listing blocked locations and blocked times for locations, and wherein the door has an NFC reader which is configured to read the restricted virtual key, and open the lock in the door if the restricted virtual key grants access through the door at the time of use, wherein the mobile application is connected to a domestic appliance other than the lock or the key, wherein the mobile application is connected to a database storing information of the property unit and one or more domestic appliances in the property unit, and, wherein the system is configured to generate at least one of data output or actionable data linking domestic appliance data with lock and key related access data in the property unit from the messaging inbox.

19. A software program product as claimed in claim 18, wherein a domestic appliance is turned on or off based on at least one of a change or anticipated change in key and lock data.

20. A software program product as claimed in claim 18 wherein a user manual file of the domestic appliance is capable of being displayed to a user of the property unit on a display within the property unit or on the mobile device screen based on virtual key and lock data.

21. A software program product as claimed in claim 18 wherein the messaging inbox is an email inbox, a text message inbox, or a social media inbox.

22. A system as claimed in claim 1, wherein the mobile application is connected to a domestic appliance other than the lock or the key, wherein the mobile application is connected to a database storing information of the property unit and one or more domestic appliances in the property unit, and, wherein the system is configured to generate at least one of data output or actionable data linking domestic appliance data with lock and key related access data in the property unit.

23. A software program product as claimed in claim 5, wherein the mobile application is connected to a domestic appliance other than the lock or the key, wherein the mobile application is connected to a database storing information of the property unit and one or more domestic appliances in the property unit, and, wherein the system is configured to generate at least one of data output or actionable data linking domestic appliance data with lock and key related access data in the property unit.

* * * * *